(12) United States Patent
Sakakibara et al.

(10) Patent No.: US 11,967,909 B2
(45) Date of Patent: Apr. 23, 2024

(54) POWER CONVERSION DEVICE PERFORMING FIRST AND SECOND CONVERSION OPERATIONS

(71) Applicant: DAIKIN INDUSTRIES, LTD., Osaka (JP)

(72) Inventors: Kenichi Sakakibara, Osaka (JP); Tomoisa Taniguchi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 235 days.

(21) Appl. No.: 17/707,223

(22) Filed: Mar. 29, 2022

(65) Prior Publication Data

US 2022/0224248 A1 Jul. 14, 2022

Related U.S. Application Data

(63) Continuation of application No. PCT/JP2020/034748, filed on Sep. 14, 2020.

(30) Foreign Application Priority Data

Sep. 30, 2019 (JP) .................................. 2019-179995

(51) Int. Cl.
*H02M 7/539* (2006.01)
*H02M 1/42* (2007.01)
(Continued)

(52) U.S. Cl.
CPC ....... *H02M 7/5395* (2013.01); *H02M 1/4208* (2013.01); *H02M 5/458* (2013.01);
(Continued)

(58) Field of Classification Search
CPC .. H02M 7/5395; H02M 1/4208; H02M 5/458; H02M 5/4585; H02M 7/219;
(Continued)

(56) References Cited

U.S. PATENT DOCUMENTS

| 2004/0145338 A1* | 7/2004 | Nakamura | ................ B60L 3/12 |
| | | | 318/434 |
| 2005/0099829 A1* | 5/2005 | Wei | ..................... H02M 5/4585 |
| | | | 363/34 |

(Continued)

FOREIGN PATENT DOCUMENTS

| CN | 108512430 A | 9/2018 |
| JP | 2012-157197 A | 8/2012 |

(Continued)

OTHER PUBLICATIONS

International Search Report of corresponding PCT Application No. PCT/JP2020/034748 dated Dec. 1, 2020.

(Continued)

*Primary Examiner* — Yusef A Ahmed
(74) *Attorney, Agent, or Firm* — Global IP Counselors, LLP

(57) ABSTRACT

In a first section of a power conversion device, a second switch is turned off, a first duty drec and a third duty dz are selected so that a direct current voltage Vdc to be input to a current source becomes equal to a direct current voltage command value Vdc*, a first conversion operation of supplying power from the voltage source to the current source is performed, and the capacitor is charged by the rectified voltage via the clamp diode. In a second section of the power conversion device, a first switch is turned off, a second duty dc and the third duty dz are selected so that the direct current voltage Vdc to be input to the current source becomes equal to the direct current voltage command value Vdc*, and a second conversion operation of supplying power from the capacitor to the current source is performed.

16 Claims, 21 Drawing Sheets

(51) Int. Cl.
*H02M 5/458* (2006.01)
*H02M 7/219* (2006.01)
*H02M 7/5387* (2007.01)
*H02M 7/5395* (2006.01)

(52) U.S. Cl.
CPC ......... *H02M 5/4585* (2013.01); *H02M 7/219* (2013.01); *H02M 7/5387* (2013.01); *H02M 7/53871* (2013.01); *H02M 7/53873* (2013.01)

(58) Field of Classification Search
CPC ........... H02M 7/5387; H02M 7/53871; H02M 7/53873; H02M 1/0032; H02M 1/0048; H02M 1/14; H02M 1/15; H02M 1/4225; H02M 1/4233; H02M 3/157; H02M 1/12; H02M 1/34; H02M 3/158; H02P 6/085
See application file for complete search history.

(56) References Cited

U.S. PATENT DOCUMENTS

| | | | |
|---|---|---|---|
| 2009/0086515 A1* | 4/2009 | Sakakibara | H02M 5/4585 363/37 |
| 2011/0187308 A1* | 8/2011 | Suhama | H02P 21/00 318/798 |
| 2012/0063178 A1* | 3/2012 | Fujita | H02M 5/4585 363/126 |
| 2012/0163052 A1* | 6/2012 | Yonezawa | H02M 1/4225 363/126 |
| 2012/0242309 A1* | 9/2012 | Korzeniowski | H02M 3/158 323/282 |
| 2013/0049620 A1* | 2/2013 | Komiya | H05B 45/375 323/311 |
| 2013/0314072 A1* | 11/2013 | Miyazaki | G01R 19/14 324/76.77 |
| 2014/0225430 A1* | 8/2014 | Oyobe | B60L 58/12 307/9.1 |
| 2015/0236606 A1* | 8/2015 | Sakakibara | H02M 5/14 363/37 |
| 2015/0244282 A1* | 8/2015 | Yamashita | H02M 5/458 363/35 |
| 2015/0280601 A1* | 10/2015 | Sakakibara | H02M 1/15 363/37 |
| 2016/0233782 A1* | 8/2016 | Sakakibara | H02M 1/42 |
| 2016/0248335 A1* | 8/2016 | Sakakibara | H02M 1/08 |
| 2016/0294300 A1* | 10/2016 | Sakakibara | H02M 7/48 |
| 2017/0201202 A1* | 7/2017 | Yamashita | H02M 1/143 |
| 2017/0279372 A1* | 9/2017 | Sakakibara | H02M 7/12 |
| 2017/0279398 A1* | 9/2017 | Taniguchi | H02M 7/06 |
| 2017/0310235 A1* | 10/2017 | Sakakibara | H02M 1/4208 |
| 2017/0324348 A1* | 11/2017 | Yamashita | H02M 1/08 |
| 2018/0091061 A1* | 3/2018 | Sakakibara | H02M 1/08 |
| 2018/0367080 A1* | 12/2018 | Ishizeki | H02M 5/4585 |
| 2019/0222135 A1* | 7/2019 | Sakakibara | H02M 1/4225 |
| 2020/0106359 A1* | 4/2020 | Sakakibara | H02M 7/48 |
| 2020/0169187 A1* | 5/2020 | Kobayashi | H02M 1/4233 |
| 2021/0036599 A1* | 2/2021 | Iyasu | H02M 1/12 |
| 2021/0313903 A1* | 10/2021 | Sakakibara | H02M 7/219 |

FOREIGN PATENT DOCUMENTS

| | | |
|---|---|---|
| JP | 2014-82926 A | 5/2014 |
| JP | 5629885 B2 | 11/2014 |

OTHER PUBLICATIONS

European Search Report of corresponding EP Application No. 20 87 2933.5 dated Sep. 22, 2023.
International Preliminary Report of corresponding PCT Application No. PCT/JP2020/034748 dated Apr. 14, 2022.

\* cited by examiner

POWER CONVERSION DEVICE PERFORMING FIRST AND SECOND CONVERSION OPERATIONS

CROSS-REFERENCE TO RELATED APPLICATIONS

This is a continuation of International Application No. PCT/JP2020/034748 filed on Sep. 14, 2020, which claims priority to Japanese Patent Application No. 2019-179995, filed on Sep. 30, 2019. The entire disclosures of these applications are incorporated by reference herein.

BACKGROUND

Technical Field

The present disclosure relates to a power conversion device.

Background Art

Conventionally, there is a power conversion device including a first power source line, a second power source line to which a potential lower than that of the first power source line is applied, a diode rectifier, a charge and discharge circuit provided between the first power source line and the second power source line, and an inverter to which a rectified voltage between the first power source line and the second power source line is input, the inverter operating based on a voltage vector (see U.S. Pat. No. 5,629,885).

In the power conversion device, the charge and discharge circuit exchanges power between the first power source line and the second power source line, thereby reducing power pulsation and improving voltage use rate.

SUMMARY

However, in the power conversion device, there is a problem that the peak current of the charging current to the charge and discharge circuit is large at the time of low load, and the improvement of partial load efficiency is not sufficient due to a voltage drop in discharge from the charge and discharge circuit.

The present disclosure proposes a power conversion device capable of improving partial load efficiency.

A power conversion device of the present disclosure is a power conversion device that includes a circuit represented by an equivalent circuit including a voltage source that converts a single-phase alternating current voltage Vin and outputs a rectified voltage, a first switch having one end connected to an output end of the voltage source, the first switch becoming electrically conductive in accordance with a predetermined first duty drec, a second switch having one end connected to an other end of the first switch, the second switch becoming electrically conductive in accordance with a predetermined second duty dc, a capacitor having one end connected to an other end of the second switch and an other end connected to a common end of the voltage source, a clamp diode connected in parallel with the second switch, a third switch having a first end connected to the other end of the first switch, a second end connected to the common end of the voltage source, and a third end selectively electrically connected to the first end or the second end, the third end electrically connected to the first end in accordance with a predetermined third duty dz, and a current source having one end connected to the other end of the first switch and an other end connected to the third end of the third switch Sz. The third switch and the current source form a 3n-phase voltage shape inverter where n is a positive integer. The power conversion device is configured such that in a first section where an instantaneous value of the voltage source is higher than a direct current voltage command value Vdc*, the second switch is turned off, the first duty drec and the third duty dz are selected so that a direct current voltage Vdc to be input to the current source becomes equal to the direct current voltage command value Vdc*, a first conversion operation of supplying power from the voltage source to the current source is performed, and the capacitor is charged by the rectified voltage via the clamp diode. The power conversion device is configured such that in a second section where an instantaneous value of the voltage source is equal to or less than the direct current voltage command value Vdc*, the first switch is turned off, the second duty dc and the third duty dz are selected so that a direct current voltage Vdc to be input to the current source becomes equal to the direct current voltage command value Vdc*, and a second conversion operation of supplying power from the capacitor to the current source is performed.

DETAILED DESCRIPTION OF EMBODIMENT(S)

Figure 1:
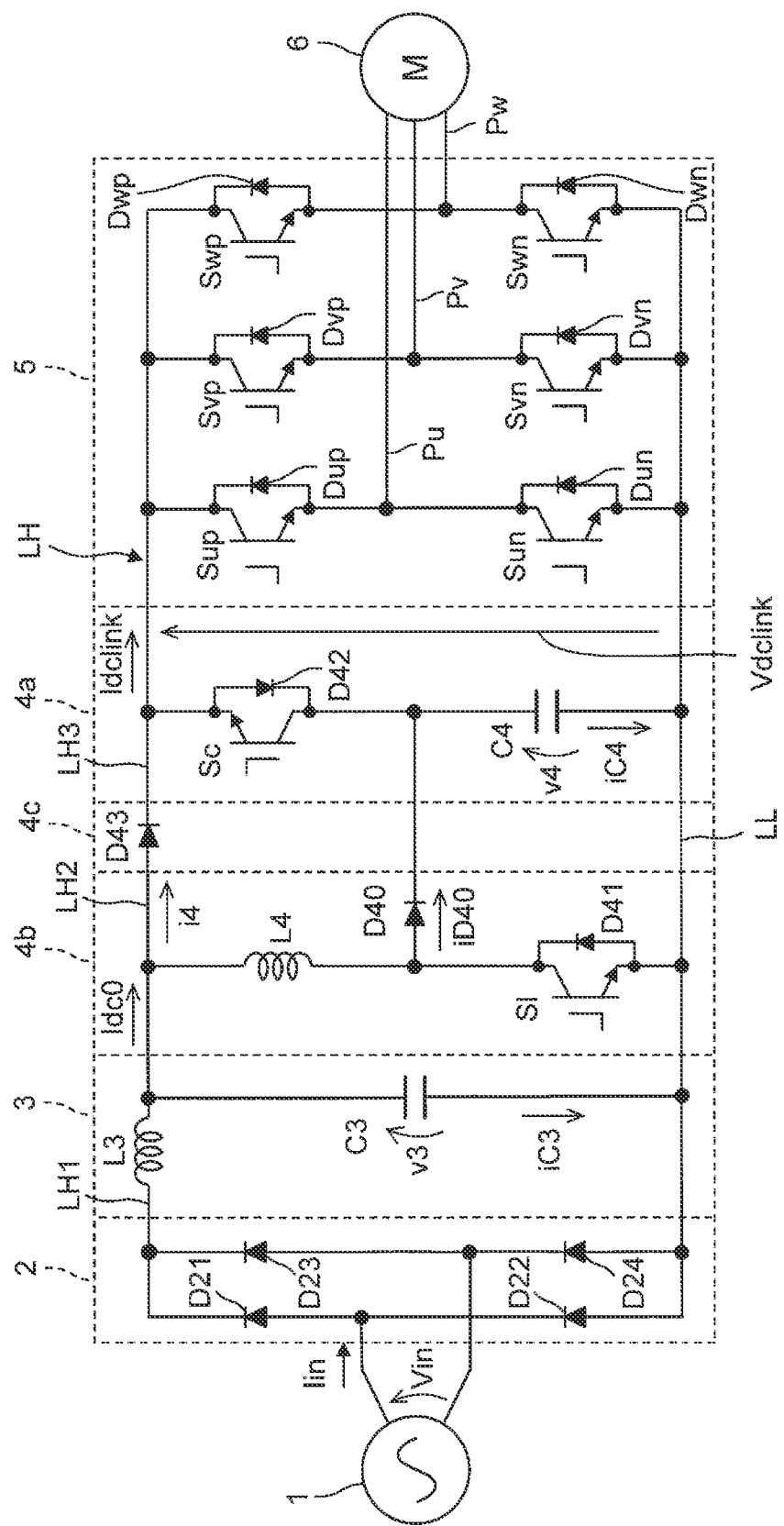
FIG. 1 is a circuit diagram of a power conversion device according to a first embodiment of the present disclosure.

Embodiments will be described below. In the drawings, the same reference numerals represent the same or corresponding parts.

FIRST EMBODIMENT

FIG. 1 is a circuit diagram of the power conversion device according to the first embodiment of the present disclosure.

Figure 6:
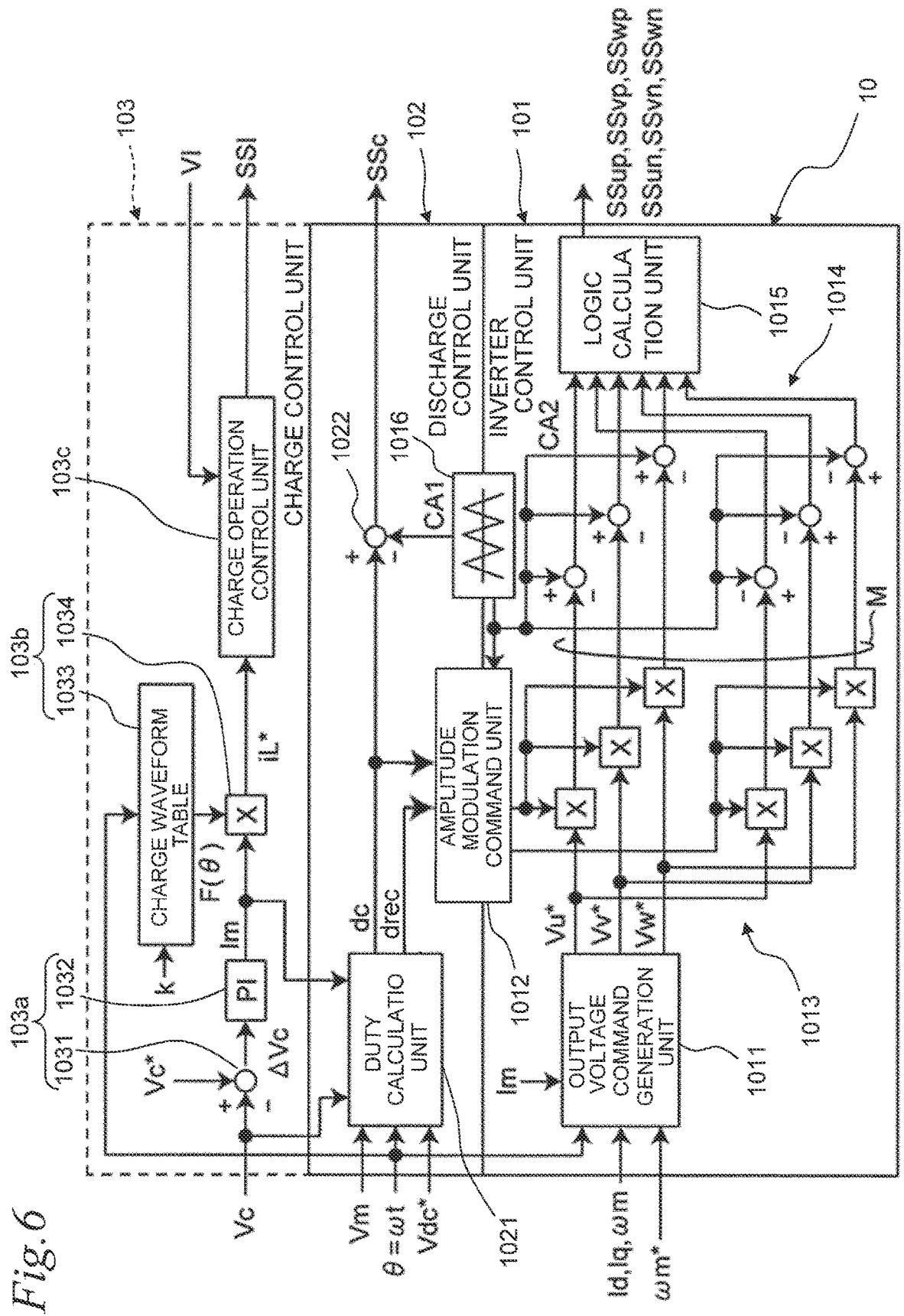
FIG. 6 is a block diagram of a control device of the power conversion device according to the first embodiment.

As in FIG. 1, the power conversion device of the first embodiment includes a converter unit 2, a filter unit 3, a buffer circuit 4a, a charging circuit 4b, a current blocking unit 4c, an inverter unit 5, and a control device 10 (see FIG. 6). The power conversion device has a positive output end of the converter unit 2 connected to a first power source line LH, and a negative output end of the converter unit 2 connected to a second power source line LL. The first power source line LH includes a power source line part LH1 having one end connected to the positive output end of the converter unit 2, a power source line part LH2 having one end connected to the other end of the power source line part LH1 via a reactor L3, and a power source line part LH3 having one end connected to the other end of the power source line part LH2 via a diode D43.

The converter unit 2 includes a bridge circuit including diodes D21 to D24 connected to a single-phase alternating current power source 1. By single-phase full-wave rectification, the diodes D21 to D24 convert a single-phase alternating current voltage Vin input from the single-phase alternating current power source 1 into a rectified voltage, and output the rectified voltage between the power source line part LH1 of the first power source line LH and the second power source line LL. A potential higher than that of the second power source line LL is applied to the power source line part LH1 of the first power source line LH. An input current Iin flows into the converter unit 2 from the single-phase alternating current power source 1.

The filter unit 3 includes the reactor L3 and a capacitor C3. The capacitor C3 is provided between the power source line part LH2 of the first power source line LH and the second power source line LL. The reactor L3 is connected between the power source line part LH1 and the power source line part LH2 of the first power source line LH, and is provided on the converter unit 2 side relative to the capacitor C3. The reactor L3 and the capacitor C3 constitute a so-called LC filter.

Here, the capacitor C3 is, for example, a film capacitor, and has capacitance smaller than capacitance of an electrolytic capacitor. Such the capacitor C3 hardly smooths the rectified voltage output from the converter unit 2. Therefore, a voltage v3 between both ends of the capacitor C3 pulsates at the same cycle as the cycle of pulsation of the rectified voltage.

Configuration of buffer circuit

The buffer circuit 4a is connected between the power source line part LH3 of the first power source line LH and the second power source line LL, and includes a clamp diode D42 and a transistor Sc connected in inverse-parallel to the clamp diode D42. Here, the transistor Sc is, for example, an insulated gate bipolar transistor (IGBT). The transistor Sc is connected in series on the power source line part LH3 side with respect to the capacitor C4 between the power source line part LH3 of the first power source line LH and the second power source line LL. Here, the inverse-parallel connection is a parallel connection in which the forward directions are opposite to each other. Specifically, the forward direction of the transistor Sc is a direction from the second power source line LL toward the power source line part LH3, and the forward direction of the clamp diode D42 is a direction from the power source line part LH3 toward the second power source line LL.

The buffer circuit 4a outputs substantially the same voltage as a voltage v4 between both ends of the capacitor C4 when the transistor Sc conducts. When the transistor Sc is non-conductive, the direct current link voltage Vdclink is substantially the same voltage as the voltage v3 between both ends of the capacitor C3.

Configuration of Charging Circuit

The charging circuit 4b includes a diode D40, a reactor L4, and a transistor Sl. A cathode of the diode D40 is connected between the transistor Sc and the capacitor C4. The reactor L4 is connected between the power source line part LH2 of the first power source line LH and an anode of the diode D40. The transistor Sl is connected between the second power source line LL and the anode of the diode D40. A diode D41 is connected in inverse-parallel to the transistor Sl. Since the potential of the power source line part LH2 of the first power source line LH is higher than that of the second power source line LL, no current flows through the diode D41 basically.

In the case of a partial load, the charging circuit 4b turns off the transistor SI and charges the capacitor C4 via the reactor L4 and the diode D40.

In the case of a load larger than the partial load, the charging circuit 4b charges the capacitor C4 by boosting the rectified voltage (more specifically, the voltage v3 between both ends of the capacitor C3) from the converter unit 2 by conducting the transistor Sl in accodance with the predetermined fourth duty dl, i.e. turn on transistor Sl. At this time, the voltage v4 between both ends higher than the voltage v3 between both ends is generated in the capacitor C4. Specifically, energy is accumulated in the reactor L4 by flowing a current from the power source line part LH2 of the first power source line LH to the second power source line LL via the transistor Sl, and thereafter, the energy is accumulated in the capacitor C4 via the diode D40 by turning off the transistor Sl. Since the voltage v4 between both ends of the capacitor C4 is higher than the voltage v3 between both ends, no current flows through the clamp diode D42 basically.

Configuration of Current Blocking Unit

The current blocking unit 4c is provided between the power source line parts LH2 and LH3 of the first power source line LH and between the buffer circuit 4a and the filter unit 3, and blocks a current in the buffer circuit 4a flowing from the capacitor C4 to the capacitor C3. In this embodiment, the filter unit 3 can be provided on the direct current link side by achieving the current blocking unit 4c with the diode D43. In the following embodiments, the converter unit 2 also has the function. In FIG. 1, the forward direction of the diode D43 is a direction from the converter unit 2 toward the inverter unit 5. The current blocking unit 4c may be provided between the buffer circuit 4a of the second power source line LL and the charging circuit 4b.

Configuration of Inverter Unit

A positive output end of the converter unit 2 is connected to a positive input end of the inverter unit 5 via the power source line part LH1 of the first power source line LH, the reactor L3, the power source line part LH2, the diode D43, and the power source line part LH3, and a negative output end of the converter unit 2 is connected to a negative input end of the inverter unit 5 via the second power source line LL. This inverter unit 5 outputs, from output ends Pu, Pv, and Pw, a three-phase alternating current voltage converted from the direct current link voltage Vdclink applied to the positive input end and the negative input end.

The inverter unit 5 includes six switching elements Sup, Svp, Swp, Sun, Svn, and Swn. The switching elements Sup, Svp, and Swp are connected between the output ends Pu, Pv, and Pw, respectively, and the power source line part LH3 of the first power source line LH, and the switching elements Sun, Svn, and Swn are connected between the output ends Pu, Pv, and Pw respectively, and the second power source line LL. The inverter unit 5 constitutes a so-called voltage shape inverter of PWM control, and includes six diodes Dup, Dvp, Dwp, Dun, Dvn, and Dwn.

All the diodes Dup, Dvp, Dwp, Dun, Dvn, and Dwn are arranged with their cathodes facing the power source line part LH3 side of the first power source line LH and their anodes facing the second power source line LL side. The diode Dup is connected in parallel with the switching element Sup between the output end Pu and the power source line part LH3. Similarly, the diodes Dvp, Dwp, Dun, Dvn, and Dwn are connected in parallel with the switching elements Svp, Swp, Sun, Svn, and Swn, respectively.

For example, an insulated gate bipolar transistor (IGBT) is adopted as the switching elements Sup, Svp, Swp, Sun, Svn, and Swn.

In this embodiment, the inductive load connected to the output ends Pu, Pv, and Pw of the inverter unit 5 is a motor 6, and the motor 6 rotates in accordance with the three-phase alternating current voltage from the inverter unit 5.

In the power conversion device, in the first section in which the absolute value of the instantaneous value of the single-phase alternating current voltage Vin is higher than the direct current voltage command value Vdc*, the output end of the buffer circuit 4a is cut off from the power source line part LH3 of the first power source line LH, the switching pattern of the PWM control of the inverter unit 5 is selected such that the direct current voltage converted from the output voltage of the inverter unit 5 at the time of voltage saturation becomes equal to the direct current voltage command value Vdc*, the first conversion operation of supplying power to the inverter unit 5 by the rectified voltage output from the converter unit 2 is performed, and the buffer circuit 4a is charged by the rectified voltage.

Meanwhile, in the second section where the absolute value of the instantaneous value of the single-phase alternating current voltage Vin is equal to or less than the direct current voltage command value Vdc*, the output end of the buffer circuit 4a is connected to a power source line part LH3 of the first power source line LH, the switching pattern of PWM control of the inverter unit 5 is selected such that the direct current voltage converted from the output voltage at the time of voltage saturation of the inverter unit 5 becomes equal to the direct current voltage command value Vdc*, and the second conversion operation of supplying power from the buffer circuit 4a to the inverter unit 5 is performed.

Here, the "direct current voltage converted from the output voltage at the time of voltage saturation of the inverter unit 5" can be obtained based on the output voltage at a modulation factor 1 of the inverter unit 5. Since the PWM control method of the inverter unit 5 of this embodiment is phase voltage control, the direct current voltage of the inverter unit 5 is $2\sqrt{2}/\sqrt{3}$ times the output voltage effective value at the modulation factor 1 of the inverter unit 5. When the PWM control method of the inverter unit 5 is line voltage control, the direct current voltage of the inverter unit 5 is $\sqrt{2}$ times the output voltage effective value at the modulation factor 1 of the inverter unit 5.

According to the power conversion device, by alternating the first conversion operation and the second conversion operation in accordance with the power source cycle to perform the step-down operation, when the power source cycle is divided into two in the first section and the second section in the partial load, the discharge charge from the buffer circuit 4a is halved, the peak current of the charging current to the buffer circuit 4a in the first section is reduced, the input power factor is improved, and the period of the voltage drop due to the discharge from the buffer circuit 4a is halved. This can improve the partial load efficiency.

By the charging circuit 4b charging the buffer circuit 4a with the rectified voltage in the first section, the power conversion device can suppress shunt of the charging current via the charging paths (D43 and D42) other than the charging circuit 4b, and can reduce the charging loss.

Equivalent Circuit

Figure 2:
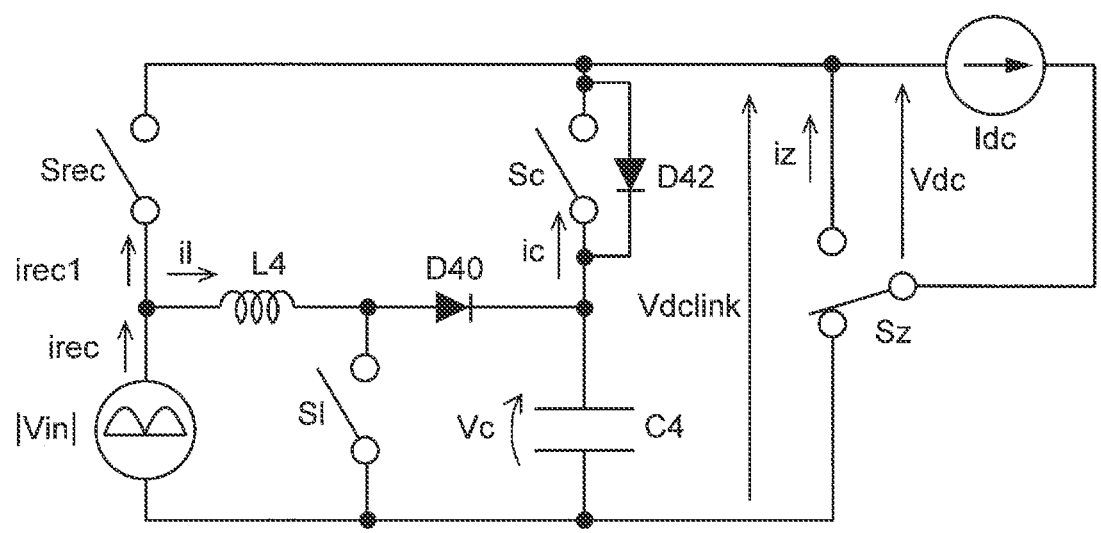
FIG. 2 is a view of an equivalent circuit of the power conversion device according to the first embodiment.

As in FIG. 2, the power conversion device is represented by an equivalent circuit including a voltage source |Vin|, a first switch Srec, a second switch Sc, a capacitor C4, a clamp diode D42, and a current source Idc. The voltage source |Vin| converts a single-phase alternating current voltage Vin and outputs a rectified voltage. The first switch Srec has one end connected to an output end of the voltage source |Vin|, the first switch Srec conducting in accordance with a predetermined first duty drec, i.e. the first switch Srec turned on in accordance with the first duty dc. The second switch Sc has one end connected to an other end of the first switch Srec, the second switch conducting in accordance with a predetermined second duty dc, i.e the second switch turned on in accordance with the second duty dc. The capacitor C4 has one end connected to an other end of the second switch Sc and an other end connected to a common end of the voltage source |Vin|. The clamp diode D42 connected in parallel with the second switch Sc. The third switch Sz has a first end connected to an other end of the first switch Srec, a second end connected to a common end of the voltage source |Vin|, and a third end selectively conducting to either the first end or the second end, i.e. a third end selectively electrically connected to the first end or the second end, the third end conducting to the first end in accordance with a predetermined third duty dz, i.e. the third end electrically connected to the first end in accordance with the third duty dz. The current source Idc has one end connected to an other end of the first switch Srec and an other end connected to the third end of the third switch Sz.

The third switch Sz and the current source Idc constitute the three-phase voltage shape inverter unit 5. The inverter unit 5 may be a 3n-phase voltage shape inverter (n is an integer of 2 or more).

The power conversion device as in FIG. 2 includes a reactor L4, a diode D40, and a fourth switch Sl. The reactor L4 has one end connected to an output end of the voltage source |Vin|. The diode D40 has an anode connected to an other end of the reactor L4 and a cathode connected to the second switch Sc side of the capacitor C4, i.e. the cathode connected to the one end of the capacitor C4. The fourth switch Sl has one end connected to an anode of the diode D40 and an other end connected to a common end of the voltage source |Vin|, the fourth switch Sl conducting in accordance with a predetermined fourth duty dl, i.e. the fourth switch Sl turned on in accordance with the fourth duty dl.

In the equivalent circuit as in FIG. 2, the current flowing from the converter unit 2 and the filter unit 3 to the inverter unit 5 is equivalently expressed as a current irec1 passing through the first switch Srec. Similarly, the discharging current flowing from the capacitor C4 to the inverter unit 5 is equivalently expressed as a current ic flowing through the second switch Sc. The current flowing through the motor 6 (inductive load) via the inverter unit 5 when the output ends Pu, Pv, and Pw are commonly connected to one of the power source line part LH3 of the first power source line LH and the second power source line LL in the inverter unit 5 for constantly controlling the direct current voltage is also equivalently expressed as a current iz passing through the third switch Sz. A similar return component associated with the PWM modulation of the inverter unit 5 is included in the notation of the current source Idc. FIG. 2 expresses the reactor L4, the diode D40, and the switch Sl that constitute the charging circuit 4b, and additionally describes a current il flowing through the reactor L4.

In the equivalent circuit of FIG. 2, the output voltage of the filter unit 3 is indicated by the voltage source |Vin|. The voltage source |Vin| outputs the rectified voltage (=absolute value of the alternating current voltage Vin) output by the converter unit 2. That is, the equivalent circuit is based on the idea that the rectified voltage is input to the inverter unit 5 when a current flows from the converter unit 2 to the inverter unit 5 (when the first switch Srec conducts).

In this equivalent circuit, when the duties with which the first to third switches Srec. Sc, and Sz conduct are the first duty drec, the second duty dc, and the third duty dz, respectively, a relationship of $$drec+dc+dz=1$$

is established.

As seen from FIG. 2, a current irec flowing through the converter unit 2 is equal to the sum of the current irec1 conducting through the first switch Srec and the current il flowing through the reactor L4. Since the current Irec is represented by the product of the first duty drec and the direct current Idc, the current irec is represented by the sum of drec Idc and the current il as shown in the above formula.

The currents irec1, ic, and iz is obtained by multiplying the direct current Idc by the first duty drec, the second duty dc, and the third duty dz, respectively. Accordingly, the currents irec1, ic, and iz are average values in the switching cycles of the first to third switches Srec, Sc, and Sz. Similarly, the current il is an average value in the switching cycle of the switch Sl.

Since the direct current Idc is the total sum of the currents irec1, ic, and iz that conduct the first to third switches Srec, Sc, and Sz, respectively, the following formula is true.

$$\begin{bmatrix} irec1 \\ ic \\ iz \end{bmatrix} = \begin{bmatrix} drec & 1 \\ dc & 0 \\ dz & 0 \end{bmatrix} \cdot \begin{bmatrix} Idc \\ il \end{bmatrix} \quad \text{Math 6}$$

Therefore, the first duty drec, the second duty dc, and the third duty dz can be regarded as current distribution factors of the direct current Idc with respect to the respective currents irec1, ic, and iz.

In the first section where an instantaneous value of the voltage source |Vin| is higher than the direct current voltage command value Vdc*, the second switch Sc is turned off, the first duty drec and the third duty dz are selected so that the direct current voltage Vdc to be input to the current source Idc becomes equal to the direct current voltage command value Vdc*, the first conversion operation of supplying power from the voltage source |Vin| to the current source Idc is performed, and the capacitor C4 is charged by the rectified voltage via the clamp diode D42.

Meanwhile, in the second section where an instantaneous value of the voltage source |Vin| is equal to or less than the direct current voltage command value Vdc*, the first switch Srec is turned off, the second duty dc and the third duty dz are selected so that the direct current voltage Vdc to be input to the current source Idc becomes equal to the direct current voltage command value Vdc*, and the second conversion operation of supplying power from the capacitor C4 to the current source Idc is performed.

Here, the direct current voltage Vdc to be input to the current source Idc is expressed by $$Vdc=Vrec \cdot drec+Vc \cdot dc$$

where the average voltage to be output from the first switch Srec is Vrec and the average voltage to be output from the second switch Sc is Vc, In the power conversion device, in a load larger than a partial load, the fourth switch Sl conducting with the predetermined fourth duty dl boosts a charging voltage to the capacitor C4 charged via the reactor L4 and the diode D40, and boosting enables the conversion operation of increasing voltage use efficiency, separately from the first and second conversion operations.

Figure 7:
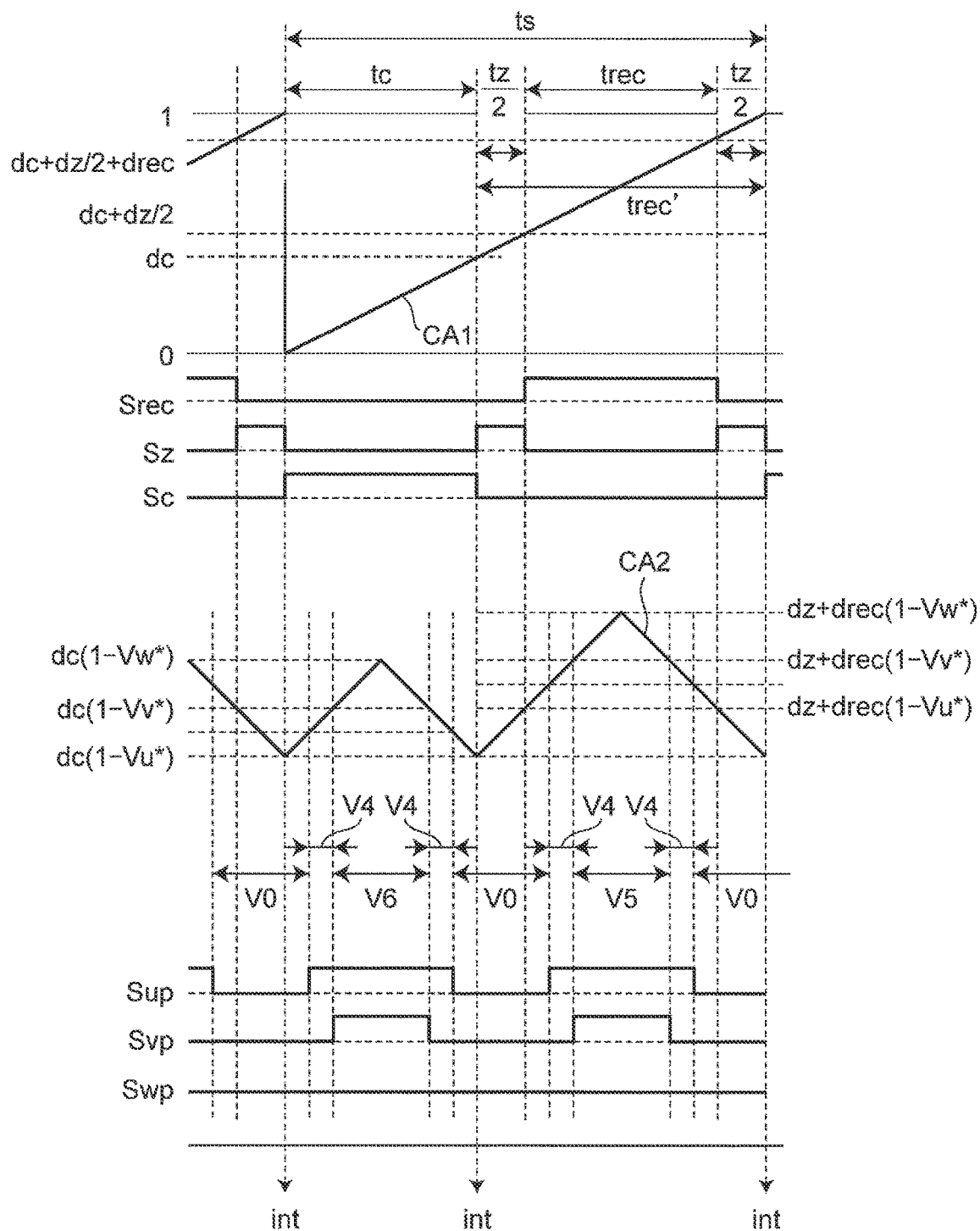
FIG. 7 is a view of an operation of the power conversion device according to the first embodiment.

In the power conversion device having the above configuration, the first duty drec, which is a duty of a current flowing from the converter unit 2 not through the buffer circuit 4a, the second duty dc, which is a duty of a current flowing through the buffer circuit 4a, and the third duty dz, which is a duty of a zero-phase current flowing in the inverter unit 5, satisfy a condition of $$drec+dc+dz=1$$

and when a maximum value of the single-phase alternating current voltage Vin is Vm, an angular velocity of the single-phase alternating current voltage Vin is ω, and time is t, the first duty drec and the second duty dc in the first section are expressed by $$d_{rec} = \frac{V_{dc}*}{V_m|\sin(\omega t)|} \quad \text{Math 7}$$
$$d_c = 0,$$

the first duty drec and the second duty dc in a period of the second section are expressed by $$d_{rec} = 0 \quad \text{Math. 8}$$
$$d_c = \frac{V_{dc}*}{V_m},$$

and the inverter unit 5 is PWM-controlled based on the phase voltage command values Vu*, Vv*, and Vw*, the first duty drec, the second duty dc, and the third duty dz (see FIG. 7).

The boundary phase angle φ between the first section in which the absolute value of the instantaneous value of the single-phase alternating current voltage Vin is higher than the direct current voltage command value Vdc* and the second section in which the absolute value of the instantaneous value of the single-phase alternating current voltage Vin is equal to or less than the direct current voltage command value Vdc* is expressed by $$\phi = \sin^{-1}\left(\frac{V_{dc}*}{V_m}\right). \quad \text{Math 9}$$

For example, when the direct current voltage command value Vdc* is Vm/√2 (Vm is the maximum value of the single-phase alternating current voltage Vin), the boundary phase angle φ is 45 deg.

According to the power conversion device, the partial load efficiency can be improved by alternating the first conversion operation and the second conversion operation in accordance with the power source cycle so as to satisfy the above condition of the first duty drec, the second duty dc, and the third duty dz in the period of the first conversion operation and the period of the second conversion operation.

Figure 3A:
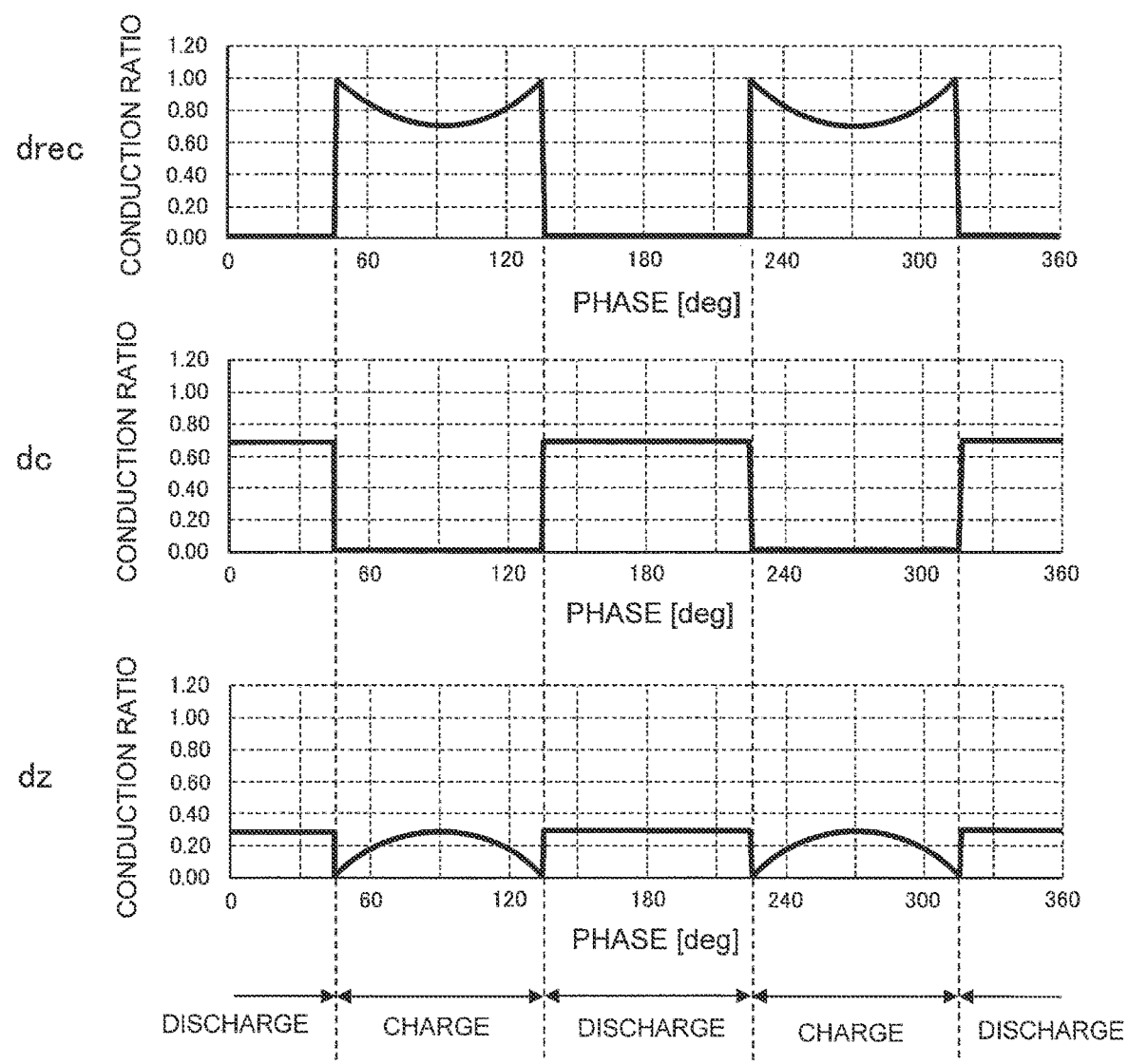
FIG. 3A is a view of a waveform of a conduction ratio of the equivalent circuit of the power conversion device according to the first embodiment.
Figure 3B:
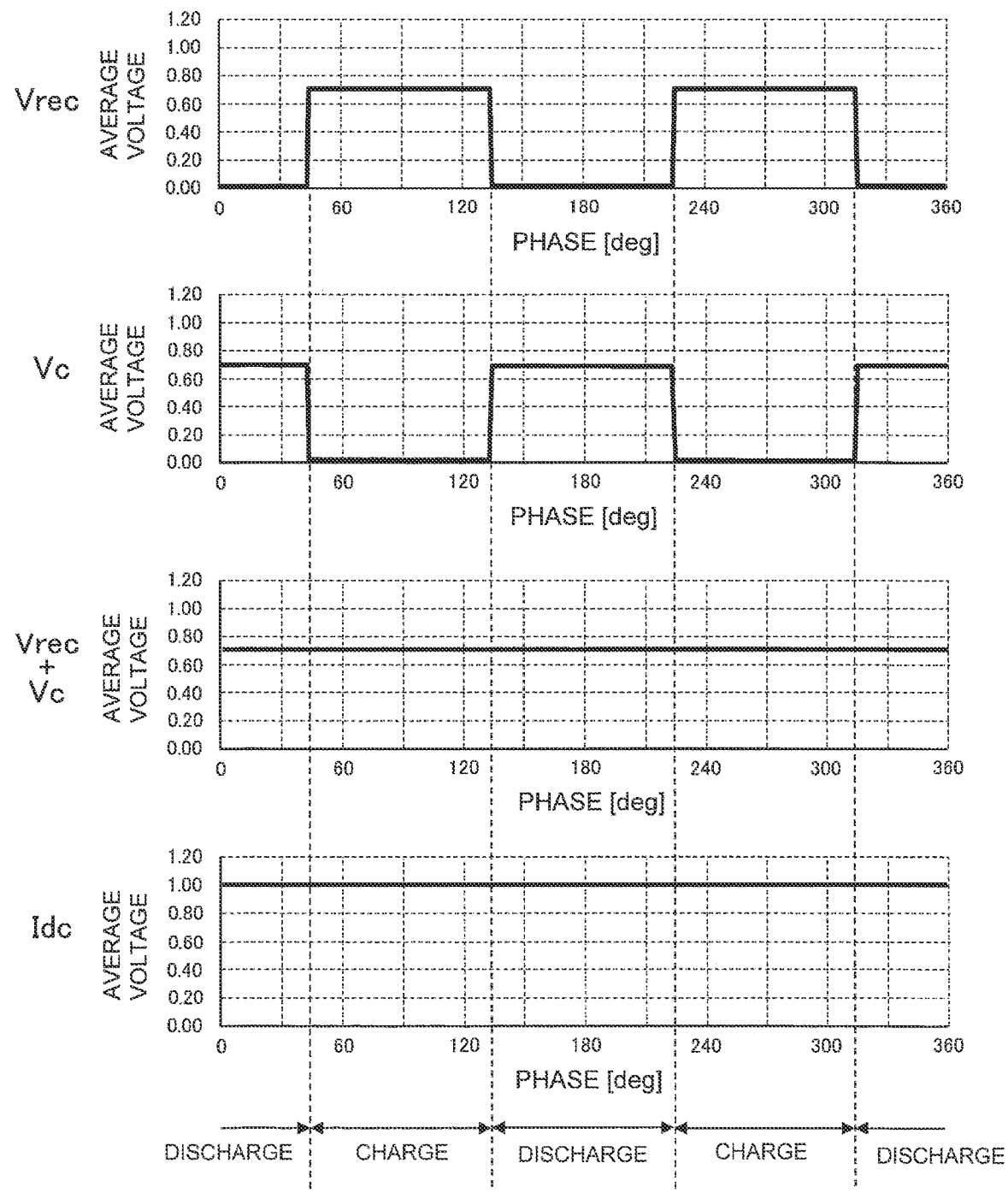
FIG. 3B is a view of an average voltage waveform and an average current waveform of each unit of the equivalent circuit of the power conversion device according to the first embodiment.
Figure 3C:
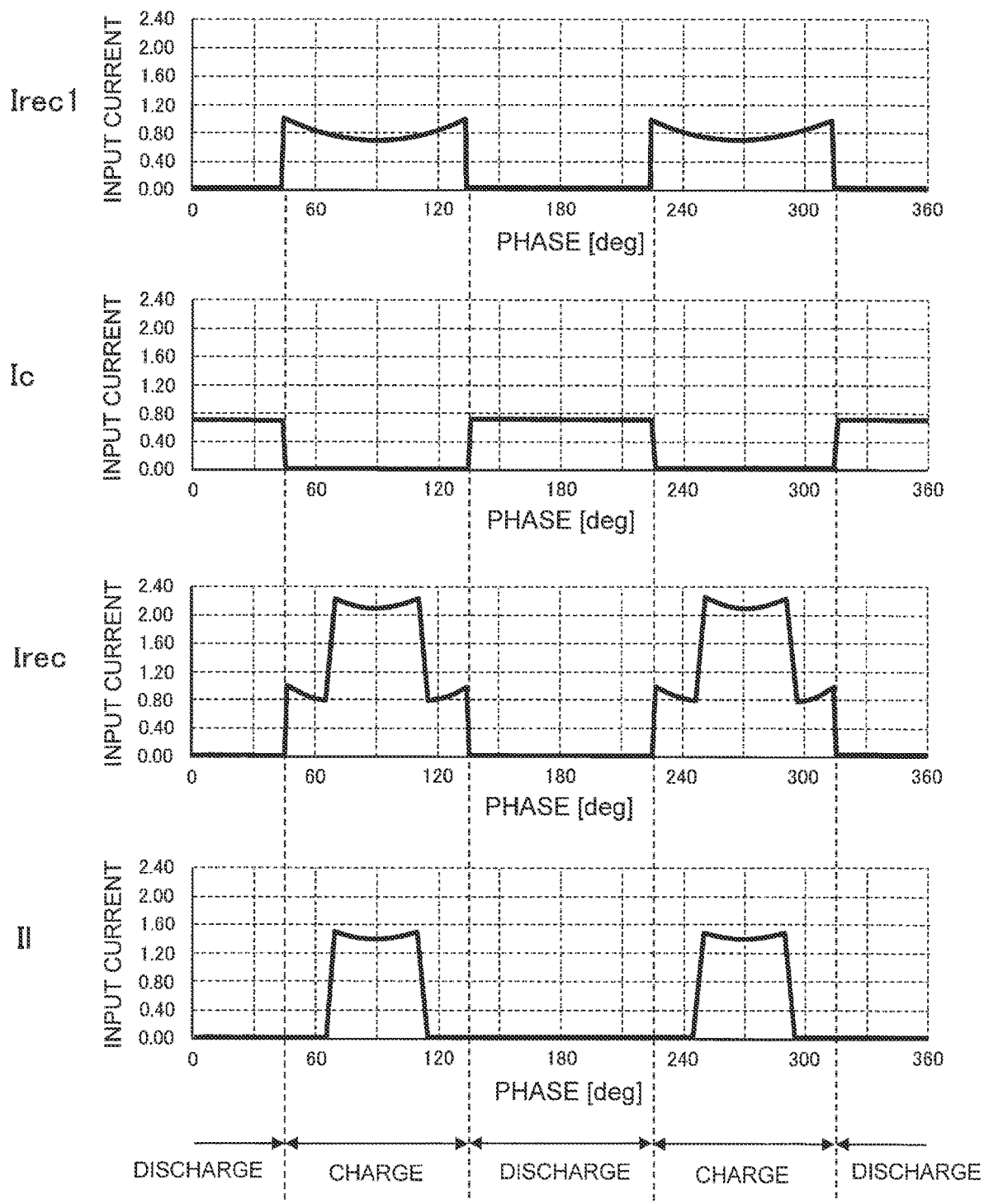
FIG. 3C is a view of a current waveform of each unit of the equivalent circuit of the power conversion device according to the first embodiment.
Figure 3D:
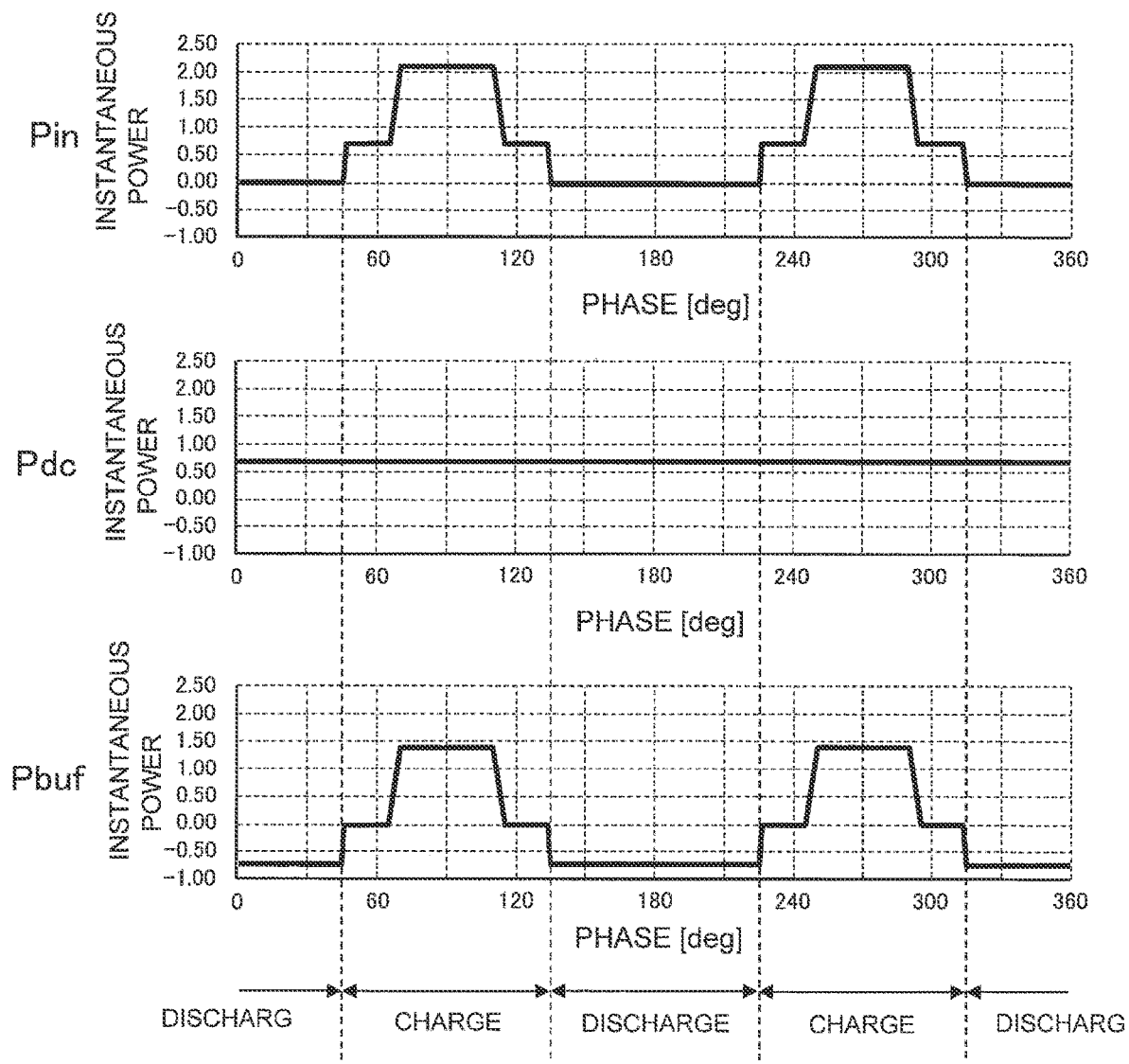
FIG. 3D is a view of an instantaneous power waveform of each unit of the equivalent circuit of the power conversion device according to the first embodiment.

FIG. 3A is a view of a waveform of a conduction ratio of the equivalent circuit of the power conversion device as in FIG. 2, FIG. 3B is a view of an average voltage waveform and an average current waveform of each unit of the equivalent circuit of the power conversion device, FIG. 3C is a view of a current waveform of each unit of the equivalent circuit of the power conversion device, and FIG. 3D is a view of an instantaneous power waveform of each unit of the equivalent circuit of the power conversion device. In FIGS. 3A to 3D, drec represents the first duty, dc represents the second duty, dz represents the third duty. Vrec represents an average voltage output from the first switch Srec, Vc represents an average voltage output from the second switch Sc, Idc represents an average current input to the current source Idc, Irec1 represents an input current of the first switch Srec, Ic represents an input current of the second switch Sc, Irec represents an input current of the voltage source |Vin|, Il represents an input current of the reactor L4, Pin represents instantaneous power from the voltage source |Vin|, Pdc represents instantaneous power supplied to the current source Idc, and Pbuf represents instantaneous power supplied from the capacitor C4 to the current source Idc.

Here, the direct current voltage command value Vdc* is Vm/√2 (Vm is the maximum value of the single-phase alternating current voltage Vin). In FIGS. 3A to 3D, the first section of the first conversion operation (charge) is 45 deg to 135 deg and 225 deg to 315 deg and the second section of the second conversion operation (discharge) is 0 deg to 45 deg, 135 deg to 225 deg, and 315 deg to 360 deg.

Figure 4:
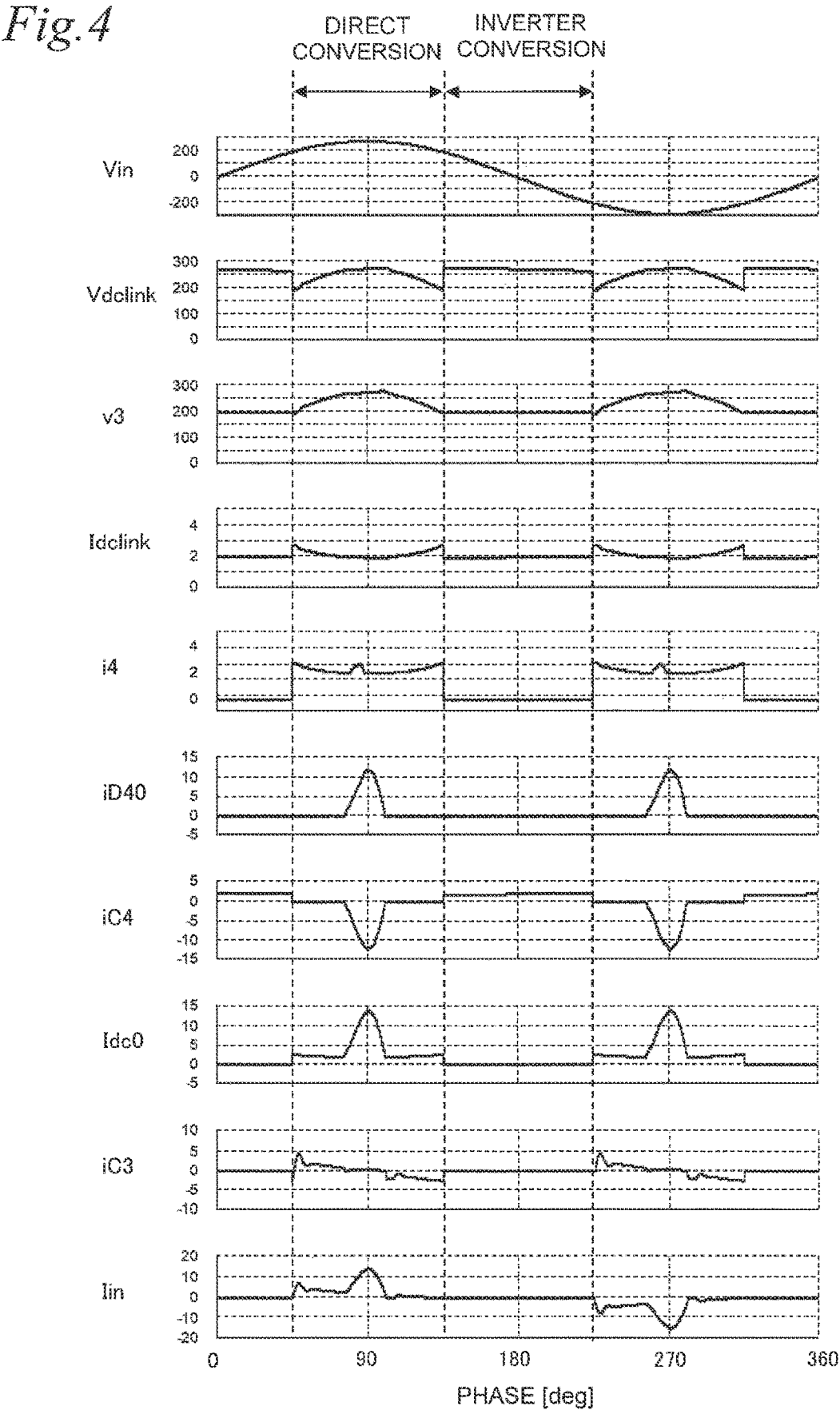
FIG. 4 is a view of a simulation waveform of voltage and current of each unit of the power conversion device according to the first embodiment.

FIG. 4 is a view of a simulation waveform of voltage and current of each unit of the power conversion device as in FIG. 1. In FIG. 4, the direct conversion is the first section of the first conversion operation (charge), and the indirect conversion is the second section of the second conversion operation (discharge). In FIG. 4, Vin represents the single-phase alternating current voltage, Vdclink represents the direct current link voltage input to the inverter unit 5, v3 represents the voltage between both ends of the capacitor C3 of the filter unit 3, Idclink represents a current input to the inverter unit 5, i4 represents a current flowing through the diode D43 of the current blocking unit 4c, iD40 represents a current flowing through the diode D40, iC4 represents a current flowing through the capacitor C4 of the buffer circuit 4a. Idc0 represents a current to be input to the charging circuit 4b, iC3 represents a current flowing through the capacitor C3 of the filter unit 3, and Iin represents an input current of the converter unit 2.

Modification

Figure 5:
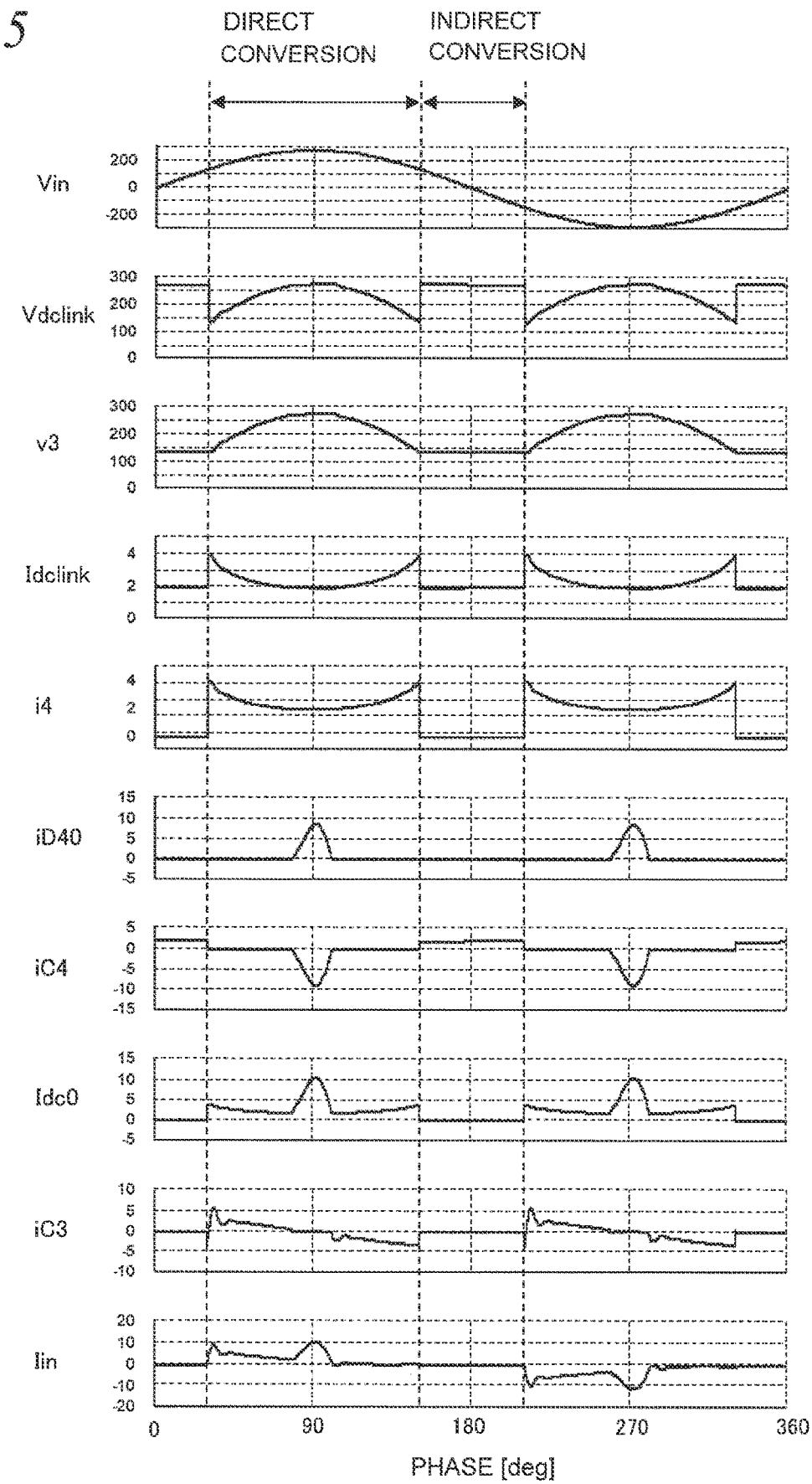
FIG. 5 is a view of a simulation waveform of voltage and current of each unit of a power conversion device according to a modification of the first embodiment.

FIG. 5 is a view of a simulation waveform of voltage and current of each unit of the power conversion device according to the modification of the first embodiment. In this modification, the direct current voltage command value Vdc* is 0.5 Vm (Vm is the maximum value of the single-phase alternating current voltage Vin). The boundary phase angle φ is 30 deg.

In FIG. 5, the first section of the first conversion operation (charge) is 30 deg to 150 deg and 210 deg to 330 deg and the second section of the second conversion operation (discharge) is 0 deg to 30 deg, 150 deg to 210 deg, and 330 deg to 360 deg.

In this modification, by setting the direct current voltage command value Vdc* to 0.5 Vm (<Vm/√2), the ratio of the second section to the first section is reduced as compared with the case where the direct current voltage command value Vdc* is Vm/√2.

Configuration of Control Device

FIG. 6 is a block diagram of the control device 10 of the power conversion device according to the first embodiment. As in FIG. 6, the control device 10 includes an inverter control unit 101, a discharge control unit 102, and a charge control unit 103.

The inverter control unit 101 outputs inverter control signals SSup, SSvp, SSwp, SSun, SSvn, and SSwn based on the first duty drec, the second duty de, and the phase voltage command values Vu*, Vv*, and Vw*. The inverter control signals SSup, SSvp, SSwp, SSun, SSvn, and SSwn control operations of the switching elements Sup, Svp, Swp, Sun, Svn, and Swn of the inverter unit 5, respectively.

The inverter control unit 101 includes an output voltage command generation unit 1011, an amplitude modulation command unit 1012, a product-sum calculation unit 1013, a comparison unit 1014, a logic calculation unit 1015, and a carrier generation unit 1016. The output voltage command generation unit 1011 generates the phase voltage command values Vu*, Vv*, and Vw* based on the phase θ (=ωt), the q-axis current Iq, the d-axis current Id, the rotational angular velocity ωm, and its command value ωm*. The amplitude modulation command unit 1012 controls the operation of the product-sum calculation unit 1013 based on the first duty drec and the second duty dc. The product-sum calculation unit 1013 performs a product-sum calculation of the phase voltage command values Vu*, Vv*, and Vw* and the first duty drec and the second duty dc to generate a signal wave M. The comparison unit 1014 outputs the comparison result of the values of the signal wave M and a carrier CA2 to the logical calculation unit 1015. The logical calculation unit 1015 performs a logical calculation on the comparison result by the comparison unit 1014 and outputs the inverter control signals SSup, SSvp, SSwp, SSun, SSvn, and SSwn.

The discharge control unit 102 includes a duty calculation unit 1021 and a comparator 1022. The duty calculation unit 1021 generates the first duty drec and the second duty dc based on the phase θ, the amplitude Vm, the voltage Vc between both ends of the capacitor C4 (v4 in FIG. 1), and the direct current voltage command value Vdc*. The comparator 1022 compares the second duty dc with a carrier CA1 and generates a discharge switch signal SSc for conducting the switch Sc.

The charge control unit 103 includes an amplitude determination unit 103a, a charge command generation unit 103b, and a charge operation control unit 103c. In the partial load, this charge control unit 103 generates a charge switch signal SSl that always turns off the switch Sl.

The amplitude determination unit 103a includes a subtractor 1031 and a proportional-integral controller 1032. The subtractor 1031 obtains a deviation ΔVc from the voltage Vc between both ends and the average voltage command value Vc*. The proportional-integral controller 1032 performs proportional-integral control on the deviation ΔVc to determine an amplitude Im. The amplitude Im affects the phase voltage command values Vu*, Vv*, and Vw*, and the operation of the inverter unit 5 is affected by the phase voltage command values Vu*, Vv*, and Vw* to reduce the deviation ΔVc. The charge command generation unit 103b includes a charge waveform table 1033 and a multiplier 1034. The charge waveform table 1033 receives a distribution factor k and the phase θ (=ωt) and outputs a function F(θ)(=F(ωt)) for the phase θ. The multiplier 1034 multiplies the amplitude Im by the function F(ωt) to determine a charge command iL*. The charge operation control unit 103c controls the operation of the charging circuit 4b based on the charge command iL* and a voltage Vl between both ends of the reactor L4. Specifically, the charge switch signal SSl for controlling the switch Sl is generated such that the reactor current il flowing through the reactor L4 becomes the reactor current command il* corresponding to the charge command iL*.

Next, the operation of the control device 10 of the power conversion device according to the first embodiment will be described with reference to FIG. 7.

In the control device 10, the carrier CA1 output from the carrier generation unit 1016 is compared with the second duty dc. The carrier CA1 has a sawtooth waveform repeated at a cycle ts.

A period in which the carrier CA1 becomes equal to or less than the second duty dc is a period tc, and a period in which the carrier CA1 becomes equal to or more than the second duty dc is a period trec'. The switch Sc is opened and closed such that the switch Sc conducts when the carrier CA1 is equal to or less than the second duty dc.

Note that a period in which the carrier CA1 is equal to or greater than a value (dc+dz/2) and equal to or less than a value (drec+de+dz/2) is trec, and a period in which the carrier CA1 is equal to or greater than the second duty dc and equal to or less than the value (dc+dz/2) or equal to or greater than the value (drec+de+dz/2) and equal to the value 1 (=drec+dc+dz) is tz/2.

The carrier CA2 output from the carrier generation unit 1016 is compared with voltage command values dc(1−Vu*), dc(1−Vv*), and dc(1−Vw*) in the period tc. The carrier CA2 has the second duty dc as the maximum value in the period tc. The carrier CA2 is compared with voltage command values dz+drec(1−Vu*), dz+drec(1−Vv*), and dz+drec(1−Vw*) in the period trec. The carrier CA2 has a discharge complementation duty(1−dc) (=dz+drec) as the maximum value in the period trec.

In this manner, using the voltage command value, the inverter unit 5 operates based on voltage vectors V0, V4, and V6 adopted in the period of a ratio (1−Vu*):(Vu*−Vv*) (Vv*−Vw*) in any of the periods tctrec in the period ts.

Furthermore, in the inverter unit 5, the buffer circuit 4a commutates in a state where the direct current Idclink does not flow by adopting the voltage vector V0 in a section (including the period tz/2) including the timing at which the buffer circuit 4a commutates.

Note that, in FIG. 7, for example, the carrier CA1 may have an inclination that is opposite, i.e., an inclination that gradually decreases, or, for example, the carrier CA1 may be a triangular wave.

Figure 8:
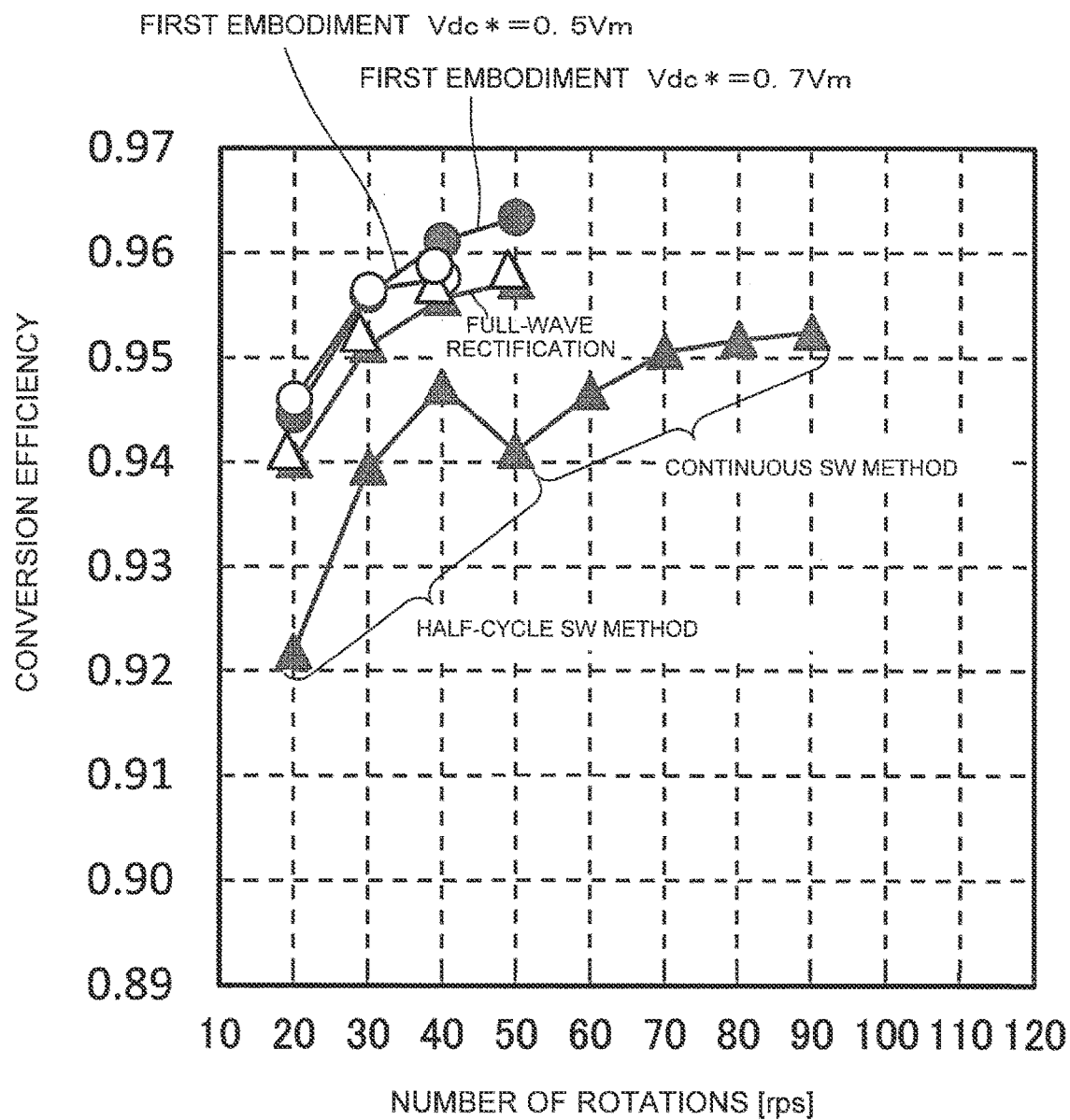
FIG. 8 is a view of a relationship between the number of rotations and the conversion efficiency when the power conversion device of the first embodiment is used to drive a motor that is an inductive load.
Figure 9:
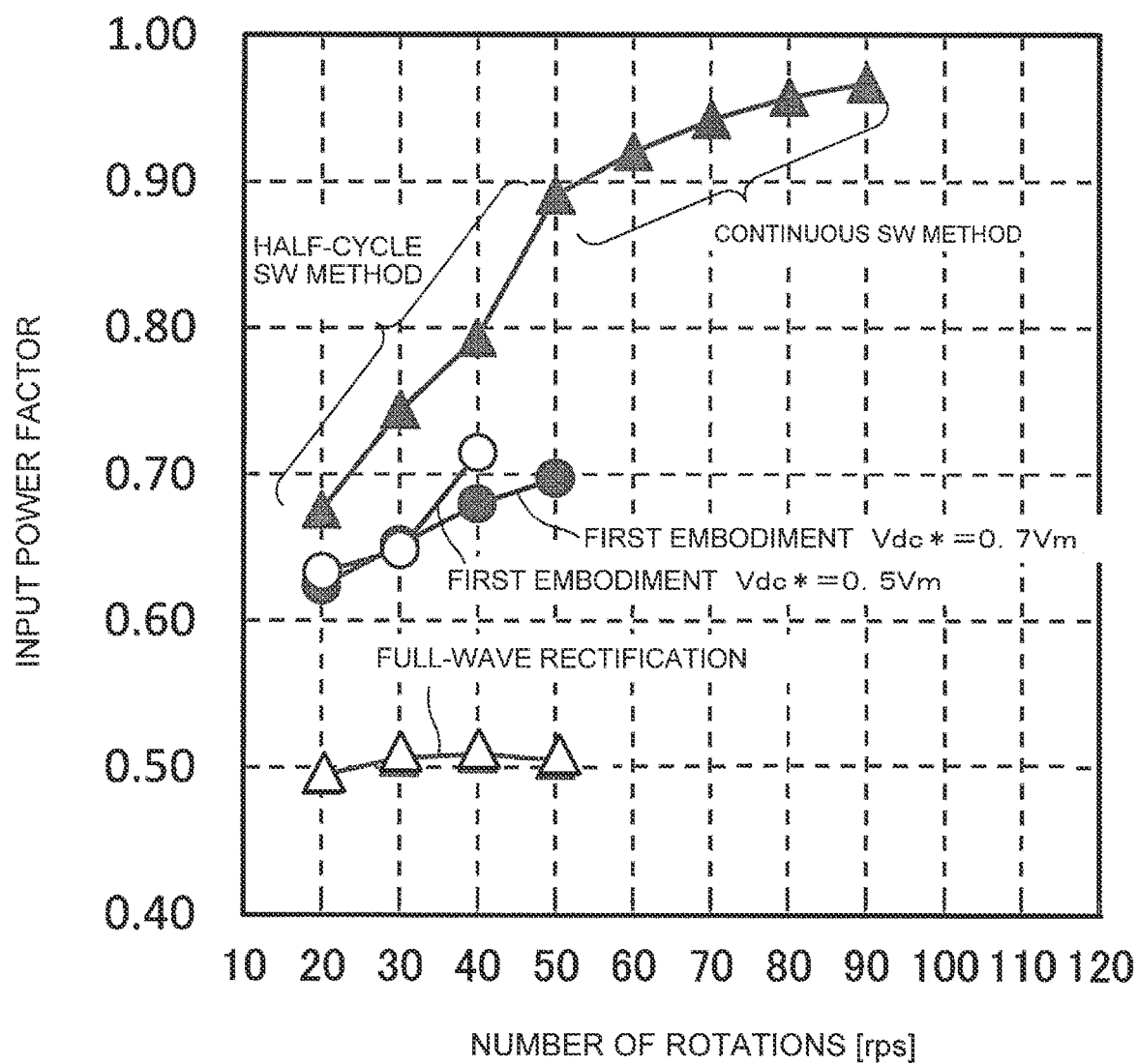
FIG. 9 is a view of a relationship between the number of rotations and an input power factor when the power conversion device of the first embodiment is used to drive a motor that is an inductive load.
Figure 10:
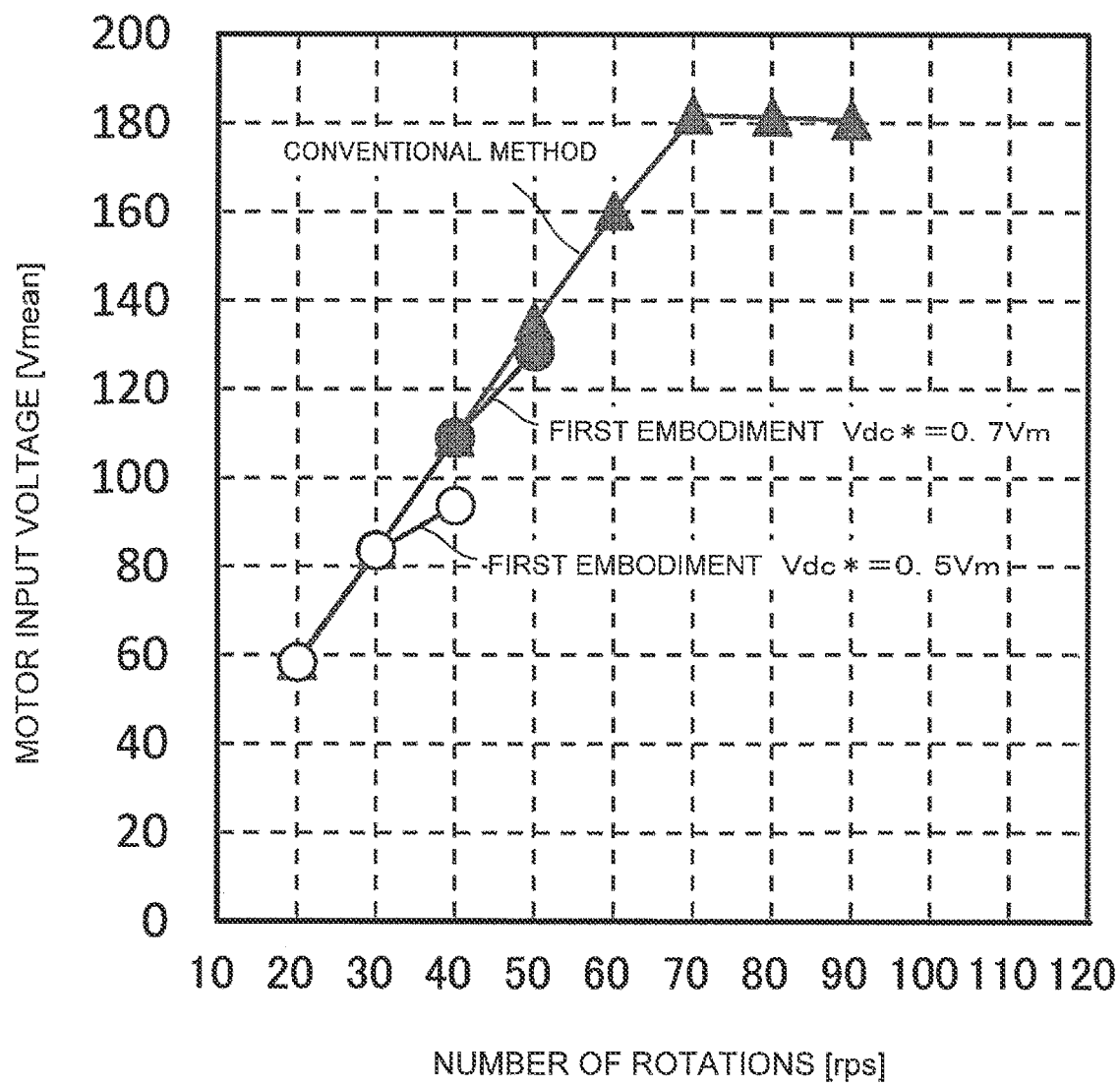
FIG. 10 is a view of a relationship between the number of rotations and a motor input voltage when the power conversion device of the first embodiment is used to drive a motor that is an inductive load.

FIG. 8 is a view of a relationship between the number of rotations and the conversion efficiency when the power conversion device of the first embodiment is used to drive the motor 6, which is an inductive load, FIG. 9 is a view of a relationship between the number of rotations and the input power factor when the power conversion device is used to drive the motor 6, and FIG. 10 is a view of a relationship between the number of rotations and the motor input voltage when the power conversion device is used to drive the motor 6. In FIG. 8, the horizontal axis represents the number of rotations [rps], and the vertical axis represents the conversion efficiency. In FIG. 9, the horizontal axis represents the number of rotations [rps], and the vertical axis represents the input power factor. In FIG. 10, the horizontal axis represents the number of rotations [rps], and the vertical axis represents the motor input voltage [Vmean].

In FIGS. 8 to 10, black circles (•) indicate a case where the power conversion device of the first embodiment operates the conversion with the direct current voltage command value Vdc* being 0.7 Vm, and white circles (○) indicate a case where the power conversion device of the first embodiment operates the conversion with the direct current voltage command value Vdc* being 0.5 Vm. White triangles (Δ) indicate a case of the power conversion device operating full-wave rectification using a diode bridge circuit without using a buffer circuit.

In FIGS. 8 to 10, black triangles (▲) indicate a use of a conventional half-cycle switching method (see U.S. Pat. No. 5,629,885) and a conventional continuous switching method (see U.S. Pat. No. 5,804,167) ("conventional method" in FIG. 10). Here, the conversion is operated by the half-cycle switching method in a low-speed range of a light load with the number of rotations of less than 50 rps, and the conversion is operated by the continuous switching method in a medium-to-high speed range of a large load with the number of rotations of 50 rps or greater.

As in FIGS. 8 and 9, the conversion efficiency of the power conversion device of the first embodiment is improved as compared with the conventional power conversion device and the full-wave rectification operation, and the input power factor is slightly worse than the conventional power conversion device, but is greatly improved as compared with the full-wave rectification operation.

Thus, in the low-speed range of a light load of the number of rotations of less than 50 rps, the input power factor in the power conversion device of the first embodiment can be improved by 0.1 to 0.2 points, the conversion efficiency can be improved by 0.5 to 1.0 percent, and this can contribute to improvement of the annual efficiency.

As in FIG. 10, at the voltage use rates of 0.7 (Vdc* is 0.7 Vm) and 0.5 (Vdc* is 0.5 Vm), when the power source voltage is 200 V, the output voltage of the power conversion device is saturated near 50 rps and 40 rps. Therefore, an operation method of reducing the motor current by switching to control for the conversion operation of the continuous switching method at 50 rps or more is advantageous in terms of efficiency.

Therefore, the power conversion device according to the first embodiment of the present disclosure includes the first mode for the first conversion operation and the second conversion operation and the second mode for the conversion operation of the continuous switching method (U.S. Pat. No. 5,804,167).

When the output frequency of the inverter unit 5 becomes higher than the first threshold value (e.g., 50 rps) from the state of the first mode in which the output frequency of the inverter unit 5 is equal to or lower than the first threshold value (e.g., 50 rps), the mode transitions to the second mode. When the output frequency of the inverter unit 5 becomes equal to or lower than the second threshold value (e.g., 50 rps) from the state of the second mode in which the output frequency of the inverter unit 5 is higher than the second threshold value (e.g., 50 rps), the mode transitions to the first mode.

As described above, by switching the first mode for the first conversion operation and the second conversion operation and the second mode for the conversion operation of the continuous switching method according to the output frequency of the inverter unit 5 having the interphase relationship with respect to the increase or decrease of the load, it is possible to operate an efficient conversion according to the load.

A stable switching can be operated by making the second threshold value lower than the first threshold value by a predetermined value (e.g., 5 rps) and providing hysteresis in switching between the first mode and the second mode.

In the first embodiment, the first mode and the second mode are switched according to the output frequency of the inverter unit 5 having the interphase relationship with respect to the increase or decrease of the load, but may be switched according to the modulation factor of the inverter unit 5 having the interphase relationship with respect to the increase or decrease of the load. In this case, an efficient conversion operation is possible according to the load. A stable switching can be operated by providing hysteresis in switching between the first mode and the second mode.

In the power conversion device of the first embodiment, by setting the direct current voltage command value Vdc* according to the output frequency of the inverter unit 5 and, for example, by reducing the ratio of the second section to the first section with the direct current voltage command value Vdc* being Vm/√2→0.5 Vm, the peak current of the charging current to the buffer circuit 4a in the first section is further reduced, the input power factor is further improved, the period of the voltage drop due to the discharge from the buffer circuit 4a is further shortened, and the partial load efficiency can be further improved.

In the first mode, the direct current voltage command value Vdc* according to the modulation factor of the inverter unit 5 may be set. In this case, by setting the direct current voltage command value Vdc* according to the modulation factor of the inverter unit to reduce the ratio of the second section to the first section, the peak current of the charging current to the buffer circuit 4a in the first section is further reduced, the input power factor is further improved, the period of the voltage drop due to the discharge from the buffer circuit 4a is further shortened, and the partial load efficiency can be further improved.

Hereinafter, the conventional half-cycle switching method (see U.S. Pat. No. 5,629,885) and the conventional continuous switching method (see U.S. Pat. No. 5,804,167) will be briefly described.

Half-Cycle Switching Method

The half-cycle switching method (see U.S. Pat. No. 5,629,885) is a conversion operation of supplying only steady power to the inverter unit while reducing power pulsation by charging and discharging pulsating power Pbuf in the buffer circuit every half cycle. Since the control of the conversion operation in the power conversion device of the half-cycle switching method is known in U.S. Pat. No. 5,629,885, the detailed description thereof will be omitted.

Continuous Switching Method

In the continuous switching method (see U.S. Pat. No. 5,804,167), unlike the half-cycle switching method, an exclusive period is not set in the power source phase, and the conversion operation with high voltage use rate is performed by charging and discharging continuously in the buffer circuit. Since the control of the conversion operation in the power conversion device of the continuous switching method is known in U.S. Pat. No. 5,629,885, the detailed description thereof will be omitted.

By setting the conversion operation of the continuous switching method to the second mode combined with the first and second conversion operations of the first mode in the power conversion device as in FIGS. 1 and 2, an efficient conversion operation becomes possible according to the load.

In the first embodiment, the first mode and the second mode are switched according to the output frequency of the inverter unit 5 having the interphase relationship with respect to the increase or decrease of the load. However, the power conversion device of the present disclosure may be a power conversion device that operates in the first mode only in the region of the partial load.

The power conversion device expressed by the circuit diagram as in FIG. 1 is an example of the configuration of the power conversion device of the present disclosure, and the power conversion device of the present disclosure may be a power conversion device including the circuit expressed by the equivalent circuit as in FIG. 2.

Second Embodiment

Figure 11:
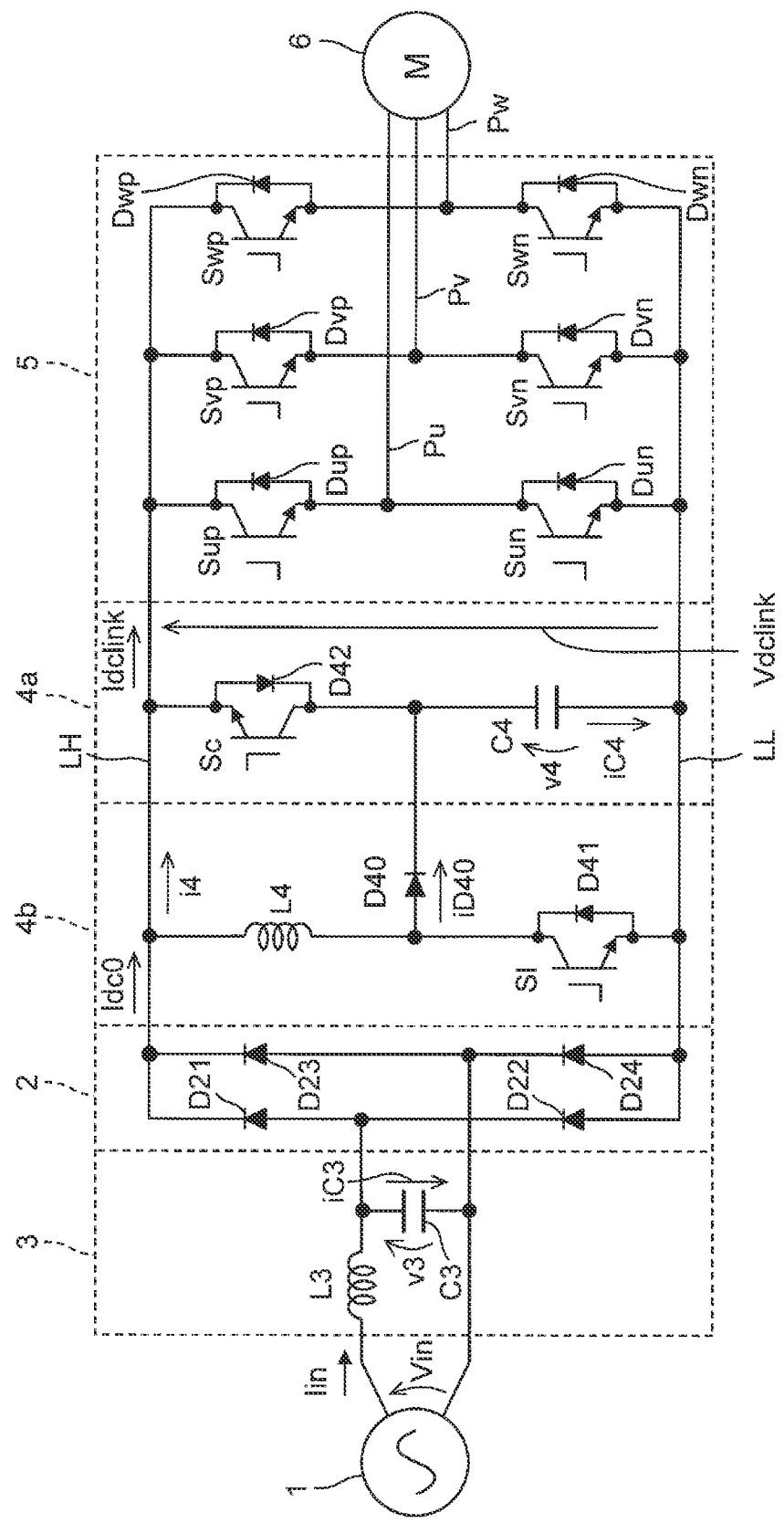
FIG. 11 is a circuit diagram of a power conversion device according to a second embodiment of the present disclosure.

FIG. 11 is a circuit diagram of the power conversion device according to the second embodiment of the present disclosure. The power conversion device of the second embodiment has the same configuration as the power conversion device of the second embodiment except for the filter unit 3.

In the power conversion device of the second embodiment, as in FIG. 11, the converter unit 2 is connected to the single-phase alternating current power source 1 via the filter unit 3. The filter unit 3 includes the reactor L3 and the capacitor C3. The reactor L3 is provided between one output end of the single-phase alternating current power source 1 and one input end of the converter unit 2. The capacitor C3 is provided between two output ends of the single-phase alternating current power source 1. The filter unit 3 removes a high-frequency component of the current.

The power conversion device of the second embodiment performs the first conversion operation and the second conversion operation similar to those of the power conversion device of the first embodiment.

The power conversion device of the second embodiment has the same effects as those of the power conversion device of the first embodiment. In the power conversion device of the second embodiment, the sum of the current Idc0 input to the charging circuit 4b and the leading current iC3 of the capacitor C3 becomes the input current by the filter unit 3 on the single-phase alternating current power source 1 side, so that the input power factor is improved.

Figure 12:
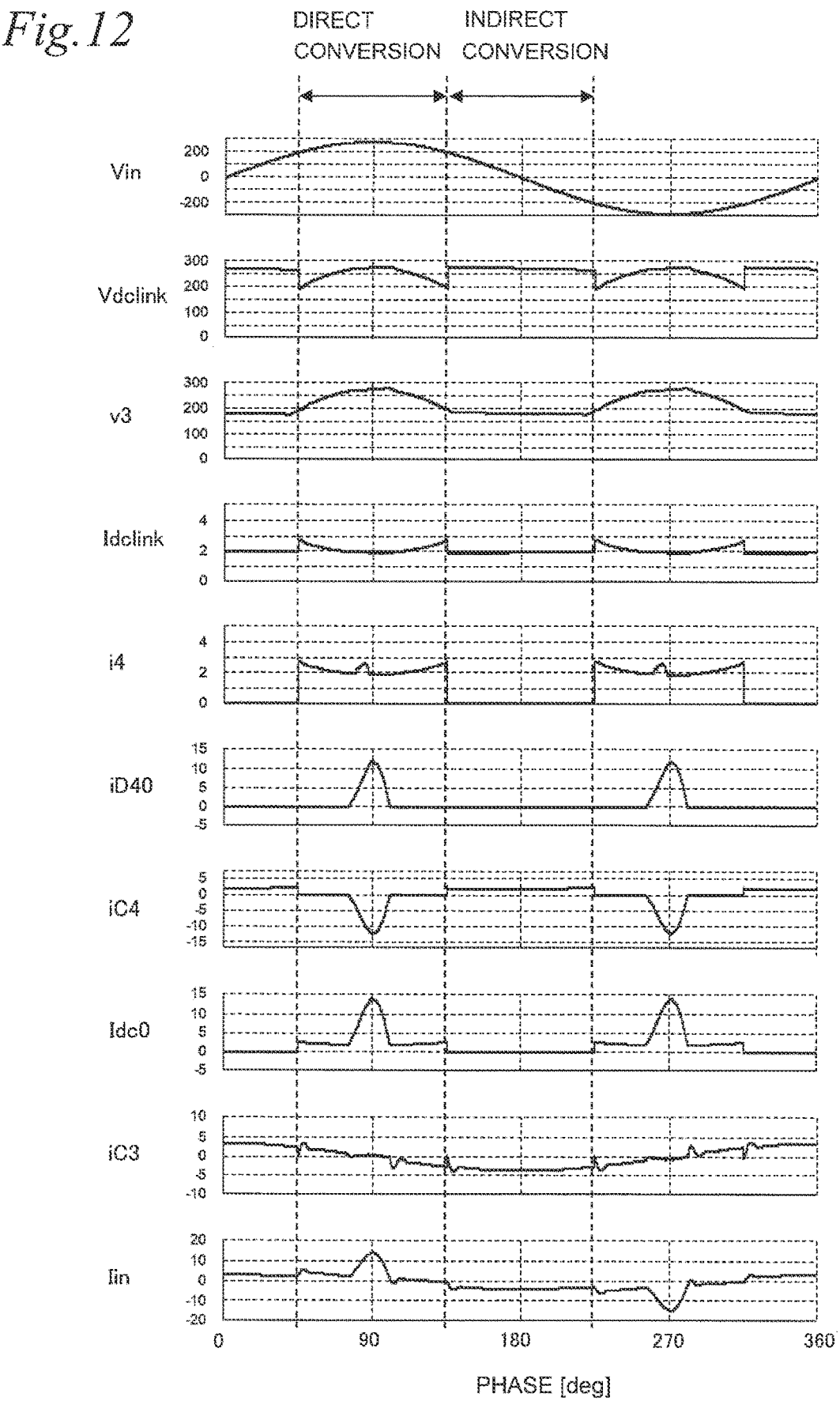
FIG. 12 is a view of a simulation waveform of voltage and current of each unit of the power conversion device according to the second embodiment.

FIG. 12 is a view of a simulation waveform of voltage and current of each unit of the power conversion device according to the second embodiment. In FIG. 12, the direct conversion is the first section of the first conversion operation (charge), and the indirect conversion is the second section of the second conversion operation (discharge). In FIG. 12, Vin represents the single-phase alternating current voltage, Vdclink represents the direct current link voltage input to the inverter unit 5, v3 represents the voltage between both ends of the capacitor C3 of the filter unit 3, Idclink represents a current input to the inverter unit 5, i4 represents a current flowing from the charging circuit 4b to the buffer circuit 4a on the first power source line LH, iD40 represents a current flowing through the diode D40, iC4 represents a current flowing through the capacitor C4 of the buffer circuit 4a, Idc0 represents a current to be input to the charging circuit 4b, iC3 represents a current flowing through the capacitor C3 of the filter unit 3, and Iin represents an input current of the converter unit 2.

In FIG. 12, the direct current voltage command value Vdc* is Vm/√2 (Vm is the maximum value of the single-phase alternating current voltage Vin), the first section of the first conversion operation (charge) is 45 deg to 135 deg and 225 deg to 315 deg and the second section of the second conversion operation (discharge) is 0 deg to 45 deg, 135 deg to 225 deg, and 315 deg to 360 deg.

In the configuration of the power conversion device of the second embodiment, a conversion operation of the half-cycle switching method (see U.S. Pat. No. 5,629,885) is also possible.

Third Embodiment

Figure 13:
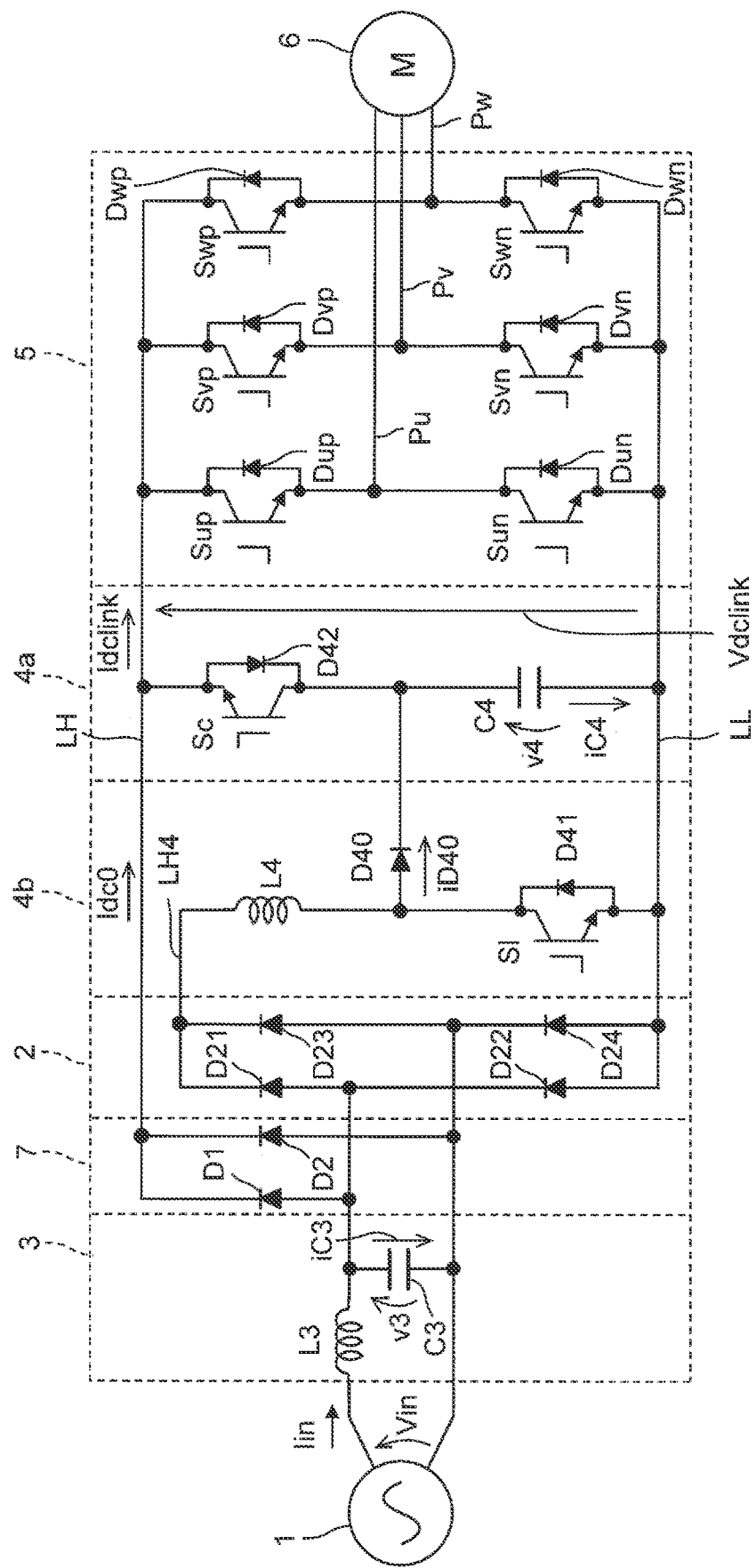
FIG. 13 is a circuit diagram of a power conversion device according to a third embodiment of the present disclosure.

FIG. 13 is a circuit diagram of the power conversion device according to the third embodiment of the present disclosure. The power conversion device of the third embodiment has the same configuration as the power conversion device of the second embodiment except for a rectifying unit 7 and the circuit configuration.

In the power conversion device of the third embodiment, the filter unit 3 is connected to the first power source line LH on the input side of the buffer circuit 4a via the rectifying unit 7. The rectifying unit 7 outputs a rectified voltage by single-phase full-wave rectification on the single-phase alternating current voltage Vin input from the single-phase alternating current power source 1.

One end of the charging circuit 4b on the reactor L4 side is connected to the positive output end of the converter unit 2 via a third power source line LH4. The other end of the charging circuit 4b is connected to the negative output end of the converter unit 2 via the second power source line LL.

The power conversion device of the third embodiment includes the first mode for the first conversion operation and the second conversion operation and the second mode for the conversion operation of the continuous switching method (U.S. Pat. No. 5,804,167) similar to those of the power conversion device of the first embodiment.

When the output frequency of the inverter unit 5 becomes higher than the first threshold value (e.g., 50 rps) from the state of the first mode in which the output frequency of the inverter unit 5 is equal to or lower than the first threshold value (e.g., 50 rps), the mode transitions to the second mode. When the output frequency of the inverter unit 5 becomes equal to or lower than the second threshold value (e.g., 50 rps) from the state of the second mode in which the output frequency of the inverter unit 5 is higher than the second threshold value (e.g., 50 rps), the mode transitions to the first mode.

In the case of the second mode with a load larger than the partial load, the charging circuit 4b boosts the direct current voltage from the converter unit 2, and the boosted direct current voltage is applied to the capacitor C4.

As described above, by switching the first mode for the first conversion operation and the second conversion operation and the second mode for the conversion operation of the continuous switching method according to the output frequency of the inverter unit 5 having the interphase relationship with respect to the increase or decrease of the load, it is possible to operate an efficient conversion according to the load.

A stable switching can be operated by making the second threshold value lower than the first threshold value by a predetermined value (e.g., 5 rps) and providing hysteresis in switching between the first mode and the second mode.

In the third embodiment, the first mode and the second mode are switched according to the output frequency of the inverter unit 5 having the interphase relationship with respect to the increase or decrease of the load, but may be switched according to the modulation factor of the inverter unit 5 having the interphase relationship with respect to the increase or decrease of the load. In this case, an efficient conversion operation is possible according to the load. A stable switching can be operated by providing hysteresis in switching between the first mode and the second mode.

The power conversion device of the third embodiment has the same effects as those of the power conversion device of the second embodiment.

Fourth Embodiment

Figure 14:
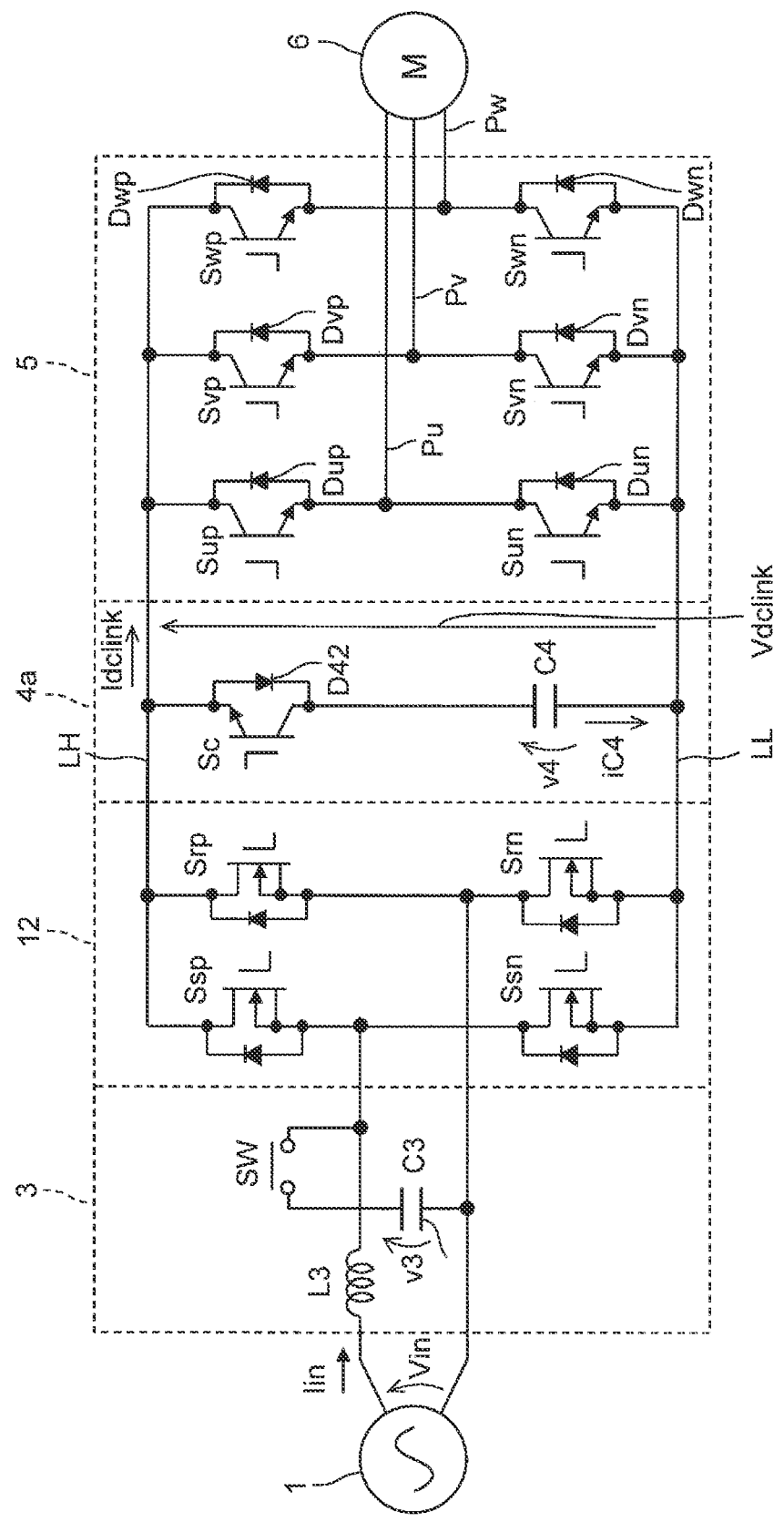
FIG. 14 is a circuit diagram of a power conversion device according to a fourth embodiment of the present disclosure.

FIG. 14 is a circuit diagram of the power conversion device according to the fourth embodiment of the present disclosure.

As in FIG. 14, the power conversion device of the fourth embodiment includes a filter unit 3, a converter unit 12, a buffer circuit 4a, an inverter unit 5, and a control device (not illustrated). The power conversion device has a positive output end of the converter unit 12 connected to a first power source line LH, and a negative output end of the converter unit 12 connected to a second power source line LL.

The converter unit 12 is connected to the single-phase alternating current power source 1 via the filter unit 3. The filter unit 3 includes a reactor L3, a capacitor C3, and a switch SW. The reactor L3 is connected between one of the two output ends of the single-phase alternating current power source 1 and the converter unit 12. The capacitor C3 and the switch SW are connected in series between two output ends of the single-phase alternating current power source 1. The filter unit 3 removes a high-frequency component of the current. In this power conversion device, in order to operate as a PWM converter as the second mode, the reactor L3 is caused to function as an interconnection reactor by opening the switch SW to cut off the capacitor C3. At this time, the buffer circuit 4a brings the switch Sc into a conductive state, and causes the capacitor C4 to function as a smoothing circuit.

The converter unit 12 includes a switching element Ssp, a switching element Ssn, a switching element Srp, and a switching element Sm. An input side of the converter unit 12 is connected to the single-phase alternating current power source 1, and an output side thereof is connected to the first power source line LH and the second power source line LL. The switching elements Ssp, Ssn, Srp, and Sm of the converter unit 12 constitute a bridge circuit.

The switching elements Ssp, Ssn, Srp, and Sm are, for example, metal oxide semiconductor field effect transistors (MOSFET), and are controlled to be turned on/off by the control device. Use of the MOSFETs for the switching elements Ssp, Ssn, Srp, and Sm an advantage of being able to reduce switching loss because high-speed switching is possible when operating as the PWM converter in the second mode. The switching elements Ssp, Ssn, Srp, and Sm have parasitic diodes inside of them. The parasitic diodes are parts of pn junction existing between the source and drain of the switching elements Ssp, Ssn, Srp, and Sm.

The saturation voltages (drain-source voltages in the ON state) of the switching elements Ssp, Ssn, Srp, and Sm are preferably lower than the forward voltage drop of the parasitic diode. This makes the voltage drop smaller when the current flows through the source and drain of the switching elements Ssp, Ssn, Srp, and Srn than when the current flows through the parasitic diode, and can reduce conduction loss. That is, the conduction loss is made smaller when the current flows through the switching element Ssp in the ON state than when the current flows through the parasitic diode in the switching element Ssp in the OFF state. The same is true for the other switching elements Ssn, Srp, and Srn.

In the power conversion device, the capacitor C4 of the buffer circuit 4a is charged not via the charging circuit 4b as in the first embodiment.

The power conversion device of the fourth embodiment performs the first conversion operation and the second conversion operation similar to those of the power conversion device of the first embodiment, and simultaneously performs full-wave rectification by synchronous rectification by the bridge circuit of the converter unit 12. Specifically, the converter unit 2 synchronously rectifies the single-phase alternating current voltage Vin and outputs a rectified voltage by turning on a pair from the switching elements Ssp, Ssn, Srp, and Srn in the period of the first conversion operation and turning off all the switching elements Ssp, Ssn, Srp, and Srn in the period of the second conversion operation in synchronization with the single-phase alternating current voltage Vin.

This causes the power conversion device to have the same effects as those of the power conversion device of the second embodiment, the loss at the time of light load to be reduced, and the efficiency at the time of light load to be improved as compared with the diode bridge circuit.

Fifth Embodiment

Figure 15:
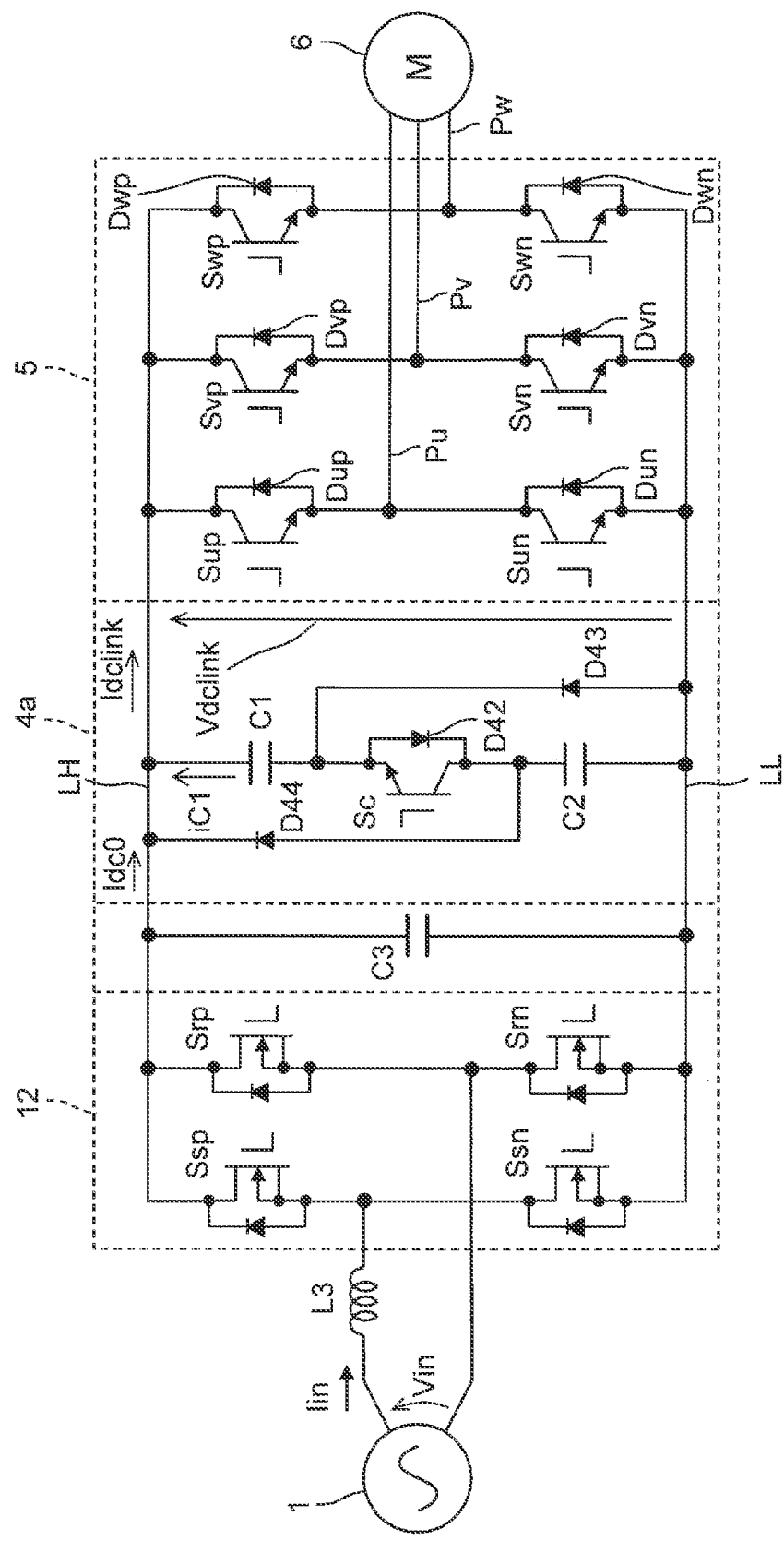
FIG. 15 is a circuit diagram of a power conversion device according to a fifth embodiment of the present disclosure.

FIG. 15 is a circuit diagram of the power conversion device according to the fifth embodiment of the present disclosure. The power conversion device of the fifth embodiment has the same configuration as the power conversion device of the fourth embodiment except for the capacitor C3 and the buffer circuit 4a.

As in FIG. 15, the power conversion device of the fifth embodiment includes a converter unit 12, a buffer circuit 4a, an inverter unit 5, and a control device (not illustrated). The power conversion device has a positive output end of the converter unit 12 connected to a first power source line LH, and a negative output end of the converter unit 12 connected to a second power source line LL.

One input end of the converter unit 12 is connected to one output end of the single-phase alternating current power source 1 via a reactor L3. The other input end of the converter unit 12 is connected to the other output end of the single-phase alternating current power source 1. A capacitor C3 is connected between the positive output end and the negative output end of the converter unit 12.

The buffer circuit 4a includes a capacitor C1, a transistor Sc, and a capacitor C2 connected in series in order from the first power source line LH between the first power source line LH and the second power source line LL. The buffer circuit 4a includes a clamp diode D42 connected in inverse-parallel with the transistor Sc, a diode D43 having a cathode connected to a connection point between the capacitor C1 and the transistor Sc and an anode connected to the second power source line LL, and a diode D44 having an anode connected to a connection point between the capacitor C2 and the transistor Sc and a cathode connected to the first power source line LH. The buffer circuit 4a is configured using a so-called valley filling circuit.

Here, the transistor Sc causes the capacitor C4 to function as a smoothing circuit by bringing Sc into a conductive state when operating as a PWM converter as the second mode, but since the capacitor C3 for filtering exists in parallel as a voltage source, switching is impossible in the first mode, unlike the fourth embodiment. Here, a short-circuit current between the capacitors can be avoided by turning on the transistor Sc after the series potential of the capacitor C1 and the capacitor C2 and the potential of the capacitor C3 are boosted from the power source peak value in the second mode.

Figure 16:
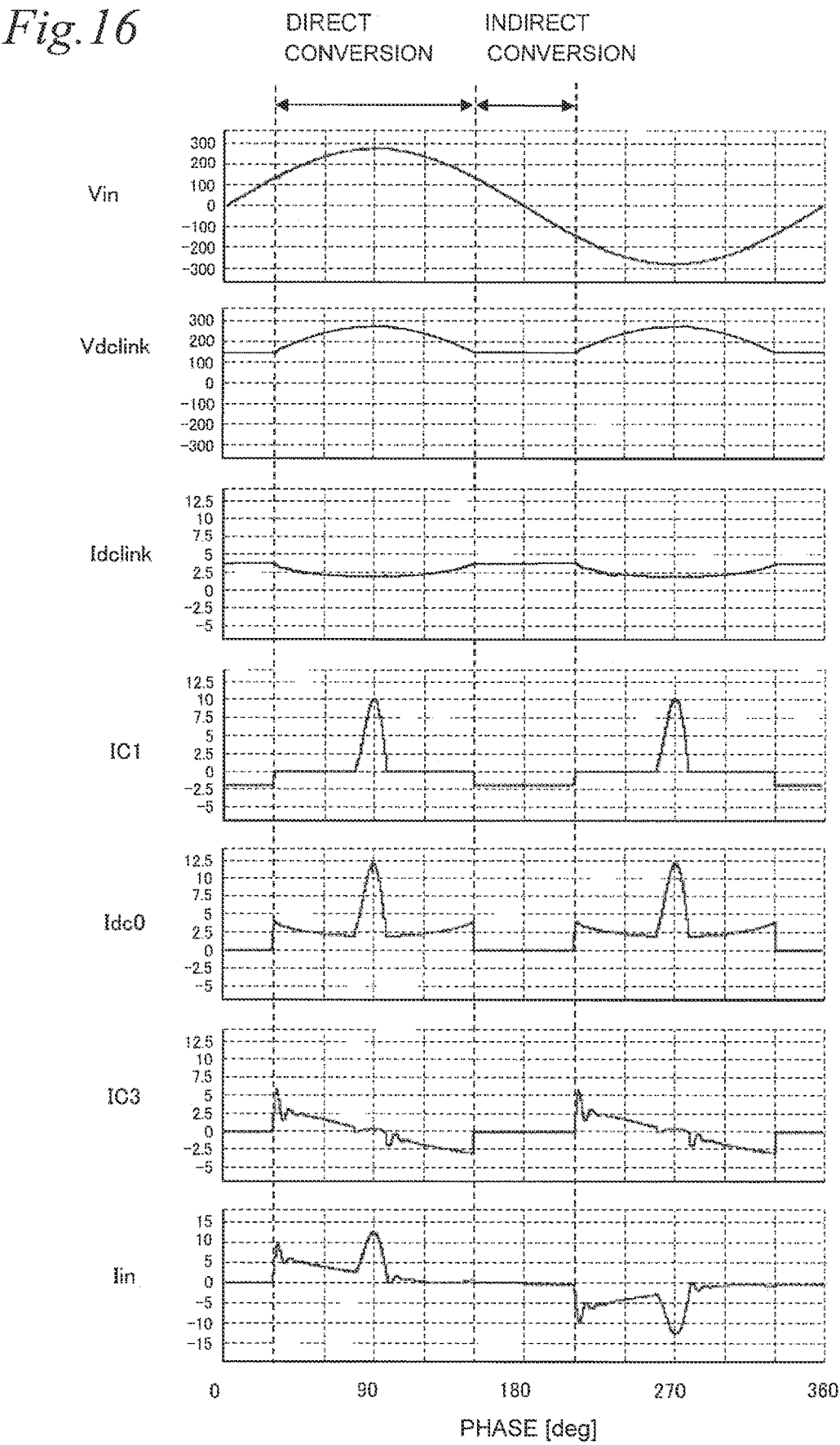
FIG. 16 is a view of a simulation waveform of voltage and current of each unit of the power conversion device according to the fifth embodiment.

FIG. 16 is a view of a simulation waveform of voltage and current of each unit of the power conversion device according to the fifth embodiment. In FIG. 16, the direct conversion is the first section of the first conversion operation (charge), and the indirect conversion is the second section of the second conversion operation (discharge). In FIG. 16, Vin represents a single-phase alternating current voltage, Vdc-link represents a direct current link voltage to be input to the inverter unit 5, Idclink represents a current to be input to the inverter unit 5, IC1 represents a current flowing through the capacitor C1, Idc0 represents a current to be input to the charging circuit 4b, iC3 represents a current flowing through the capacitor C3 of the filter unit 3, and Iin represents an input current of the converter unit 2.

In FIG. 16, the direct current voltage command value Vdc* is 0.5 Vm (Vm is the maximum value of the single-phase alternating current voltage Vin), the first section of the first conversion operation (charge) is 30 deg to 150 deg and 210 deg to 330 deg and the second section of the second conversion operation (discharge) is 0 deg to 30 deg, 150 deg to 210 deg, and 330 deg to 360 deg.

Figure 17:
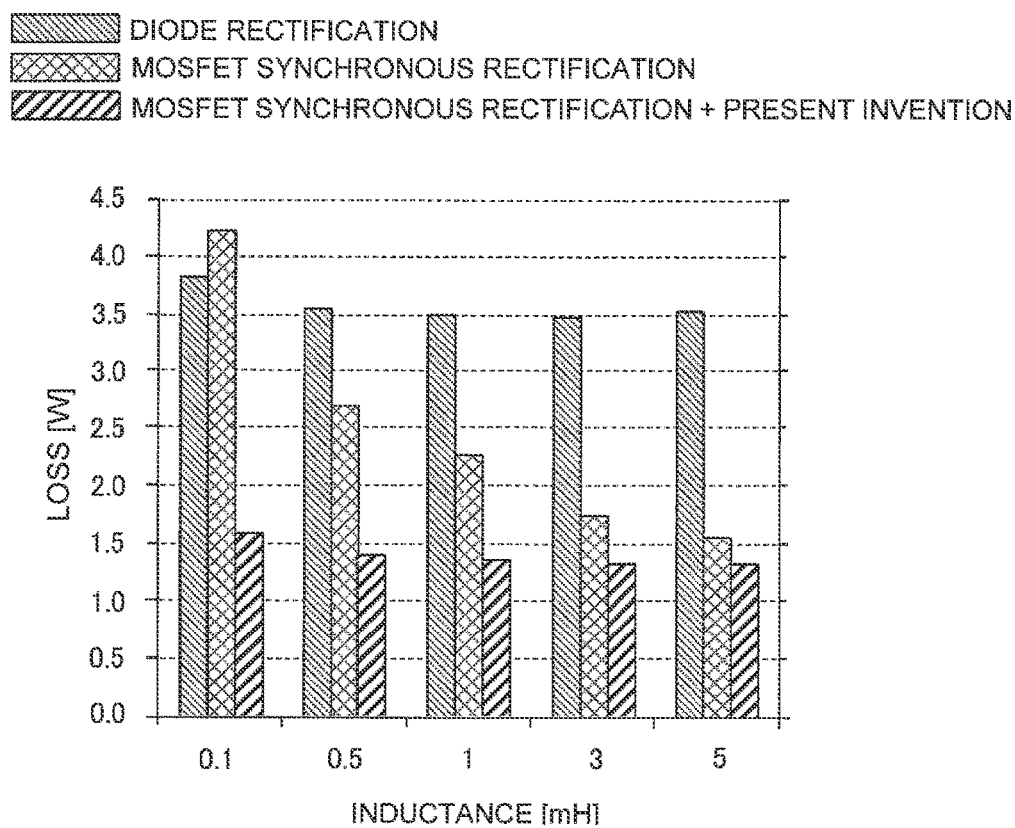
FIG. 17 is a view of a relationship between inductance and loss in the power conversion device.
Figure 18:
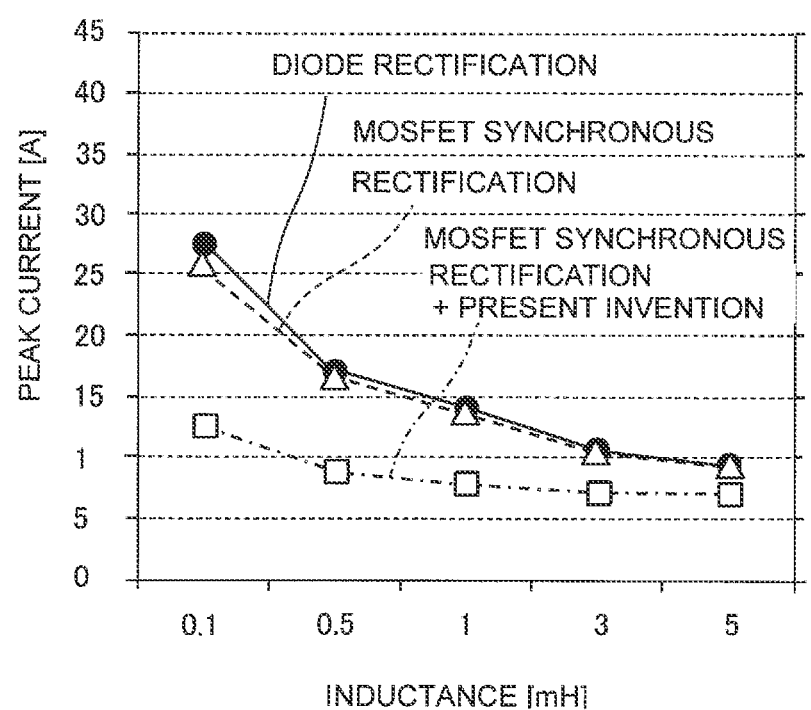
FIG. 18 is a view of a relationship between inductance and peak current in the power conversion device.

FIG. 17 is a view of a relationship between inductance and loss of the reactor forming the filter circuit in the power conversion device of the fifth embodiment, and FIG. 18 is a view of the relationship between inductance and peak current. FIGS. 17 and 18 are based on an estimation of application to maximum input 20A of a room air conditioner 200 V model. Here, the capacity of the capacitor forming the reactor and the filter circuit is 1000 μF, and the load is estimated to be 550 W as a representative value in the intermediate operation region of the medium-to-large room air conditioner.

In FIGS. 17 and 18, the loss [W] with respect to the inductance of the reactor connected to the single-phase alternating current power source in the conventional power conversion device using the diode bridge circuit is represented by "diode rectification", the loss [W] with respect to the inductance of the reactor connected to the single-phase alternating current power source in the conventional power conversion device that performs synchronous rectification using the bridge circuit by the MOSFET is represented by "MOSFET synchronous rectification", and the loss [W] with respect to the inductance of the reactor L3 in the power conversion device of the fifth embodiment is represented by "MOSFET synchronous rectification+present invention".

FIG. 17 presents a result of calculating the loss of the bridge circuit based on the static characteristic, and the synchronous rectification effect increases as the peak current value is lower and the power factor is higher than the characteristics as in FIG. 18.

As in FIG. 17, even when the inductance of the reactor L3 is set to a small value, the power conversion device according to the fifth embodiment can improve the efficiency at the time of partial load, avoid efficiency decrease at the time of the maximum load, and secure a wide operation range from the partial load to the maximum load.

Although specific embodiments of the present disclosure have been described, the present disclosure is not limited to the first to fifth embodiments, and various modifications can be made within the scope of the present disclosure. For example, an appropriate combination of the contents described in the first to fifth embodiments may be an embodiment of the present disclosure.

The invention claimed is:

1. A power conversion device comprising:
a voltage source that converts a single-phase alternating current voltage Vin and outputs a rectified voltage;
a first switch having one end connected to an output end of the voltage source, the first switch becoming electrically conductive in accordance with a predetermined first duty drec;
a second switch having one end connected to an other end of the first switch, the second switch becoming electrically conductive in accordance with a predetermined second duty dc;
a capacitor having one end connected to an other end of the second switch and an other end connected to a common end of the voltage source;
a clamp diode connected in parallel with the second switch;
a third switch having a first end connected to the other end of the first switch, a second end connected to the common end of the voltage source, and a third end selectively electrically connected to the first end or the second end of the third switch, the third end electrically connected to the first end in accordance with a predetermined third duty dz;
a current source having one end connected to the other end of the first switch and an other end connected to the third end of the third switch;
a reactor having one end connected to the output end of the voltage source;
a diode having an anode connected to an other end of the reactor and a cathode connected between the second switch and the capacitor; and
a fourth switch having one end connected to the anode of the diode, and an other end connected to the common end of the voltage source, the fourth switch becoming electrically conductive in accordance with a predetermined fourth duty dl,
the third switch and the current source forming a 3n-phase voltage shape inverter where n is a positive integer,
the power conversion device being configured such that
in a first duration where an instantaneous value of the voltage source is higher than a direct current voltage command value Vdc*, the second switch is turned off, the predetermined first duty drec and the predetermined third duty dz are selected so that a direct current voltage Vdc to be input to the current source becomes equal to the direct current voltage command value Vdc*, a first conversion operation of supplying power from the voltage source to the current source is performed, and the capacitor is charged by the rectified voltage via the clamp diode, and
in a second duration where the instantaneous value of the voltage source is equal to or less than the direct current voltage command value Vdc*, the first switch is turned off, the predetermined second duty dc and the predetermined third duty dz are selected so that the direct current voltage Vdc to be input to the current source becomes equal to the direct current voltage command value Vdc*, and a second conversion operation of supplying power from the capacitor to the current source is performed,
the predetermined first duty drec, the predetermined second duty dc, and the predetermined third duty dz satisfy $$drec+dc+dz=1$$

and
when a maximum value of the single-phase alternating current voltage Vin is Vm, an angular velocity of the single-phase alternating current voltage Vin is ω, and time is t,
the predetermined first duty drec and the predetermined second duty dc in a period of the first conversion operation are expressed by $$d_{rec} = \frac{V_{dc}*}{V_m |\sin(\omega t)|}$$

$$d_c = 0,$$

the predetermined first duty drec and the predetermined second duty dc in a period of the second conversion operation are expressed by $$d_{rec} = 0$$

$$d_c = \frac{V_{dc}*}{V_m},$$

and
a boundary phase angle φ between the first duration and the second duration is expressed by $$\emptyset = \sin^{-1}\left(\frac{V_{dc}*}{V_m}\right).$$

2. The power conversion device according to claim 1, further comprising:
a first mode configured to perform the first conversion operation and the second conversion operation; and
a second mode configured to perform another conversion operation different from the first conversion operation and the second conversion operation,
when an output frequency of the 3n-phase voltage shape inverter becomes higher than a first threshold value from a state of the first mode in which the output frequency of the 3n-phase voltage shape inverter is equal to or less than the first threshold value, the first mode transitioning to the second mode, and
when the output frequency of the 3n-phase voltage shape inverter becomes equal to or less than a second threshold value from a state of the second mode in which the output frequency of the 3n-phase voltage shape inverter is higher than the second threshold value, the second mode transitioning to the first mode, and
the second threshold value being
equal to the first threshold value or
lower than the first threshold value by a predetermined value.

3. The power conversion device according to claim 2, wherein
in the first mode, the direct current voltage command value Vdc* according to the output frequency of the 3n-phase voltage shape inverter is set.

4. The power conversion device according to claim 2, wherein
in the first mode, the direct current voltage command value Vdc* according to a modulation factor of the 3n-phase voltage shape inverter is set.

5. The power conversion device according to claim 1, further comprising:
a first mode configured to perform the first conversion operation and the second conversion operation; and
a second mode configured to perform another conversion operation different from the first conversion operation and the second conversion operation,
when a modulation factor of the 3n-phase voltage shape inverter becomes higher than a first threshold value from a state of the first mode in which the modulation factor of the 3n-phase voltage shape inverter is equal to or less than the first threshold value, the first mode transitioning to the second mode, and
when the modulation factor of the 3n-phase voltage shape inverter becomes equal to or less than a second threshold value from a state of the second mode in which the modulation factor of the 3n-phase voltage shape inverter is higher than the second threshold value, the second mode transitioning to the first mode, and
the second threshold value being
equal to the first threshold value or
lower than the first threshold value by a predetermined value.

6. The power conversion device according to claim 5, wherein
in the first mode, the direct current voltage command value Vdc* according to an output frequency of the 3n-phase voltage shape inverter is set.

7. The power conversion device according to claim 5, wherein
in the first mode, the direct current voltage command value Vdc* according to the modulation factor of the 3n-phase voltage shape inverter is set.

8. The power conversion device according to claim 1, wherein
the voltage source includes a bridge circuit including switching elements, the voltage source synchronously rectifies the single-phase alternating current voltage Vin by turning on each of the switching elements in the period of the first conversion operation in synchronization with the single-phase alternating current voltage Vin and turning off each of the switching elements in the period of the second conversion operation, and the voltage source outputs the rectified voltage.

9. A power conversion device comprising:
a converter unit that converts a single-phase alternating current voltage Vin and outputs a rectified voltage;
a first power source line connected to a positive output end of the converter unit;
a second power source line connected to a negative output end of the converter unit;
a PWM-controlled inverter unit having
a positive input end connected to the positive output end of the converter unit via the first power source line, and
a negative input end connected to the negative output end of the converter unit via the second power source line,
the PWM-controlled inverter unit outputting an alternating current voltage converted from the rectified voltage;
a buffer circuit connected between the first power source line and the second power source line, the buffer circuit including a buffer circuit switch and a capacitor;
a charging circuit that charges the buffer circuit with the rectified voltage in a first duration, the charging circuit including an inductor, a charging circuit diode, and a charging circuit switch,
an anode of the charging circuit diode being connected between the inductor and the charging circuit switch, and a cathode of the charging circuit diode being connected between the buffer circuit switch and the capacitor; and
a current blocking unit connected between the charging circuit and the buffer circuit, the current blocking unit including a current blocking unit diode,
the power conversion device being configured such that
in the first duration where an absolute value of an instantaneous value of the single-phase alternating current voltage Vin is higher than a direct current voltage command value Vdc*, an output end of the buffer circuit is cut off from the first power source line, a switching pattern of PWM control of the PWM-controlled inverter unit is selected such that a direct current voltage converted from an output voltage of the PWM-controlled inverter unit at a time of voltage saturation of the PWM-controlled inverter unit becomes equal to the direct current voltage command value Vdc*, a first conversion operation of supplying power to the PWM-controlled inverter unit by the rectified voltage having been output from the converter unit is performed, and the buffer circuit is charged by the rectified voltage, and
in a second duration section where the absolute value of the instantaneous value of the single-phase alternating current voltage Vin is equal to or less than the direct current voltage command value Vdc*, the output end of the buffer circuit is connected to the first power source line, a switching pattern of PWM control of the PWM-controlled inverter unit is selected such that the direct current voltage converted from the output voltage of the PWM-controlled inverter unit at a time of voltage saturation of the PWM-controlled inverter unit becomes equal to the direct current voltage command value Vdc*, and a second conversion operation of supplying power from the buffer circuit to the PWM-controlled inverter unit is performed, a first duty drec of a current flowing from the PWM-controlled converter unit not through the buffer circuit, a second duty dc of a current flowing through the buffer circuit, and a third duty dz of a zero-phase current flowing in the PWM-controlled inverter unit satisfy $$drec+dc+dz=1$$

and when a maximum value of the single-phase alternating current voltage Vin is Vm, an angular velocity of the single-phase alternating current voltage Vin is ω, and time is t, the first duty drec and the second duty dc in a period of the first conversion operation are expressed by $$d_{rec} = \frac{V_{dc}*}{V_m|\sin(\omega t)|}$$
$$d_c = 0,$$

the first duty drec and the second duty dc in a period of the second conversion operation are expressed by $$d_{rec} = 0$$
$$d_c = \frac{V_{dc}*}{V_m},$$

and the PWM-controlled inverter unit is PWM-controlled based on phase voltage command values Vu*, Vv*, and Vw*, the first duty drec, the second duty dc, and the third duty dz.

10. The power conversion device according to claim 9, further comprising:
a first mode configured to perform the first conversion operation and the second conversion operation; and
a second mode configured to perform another conversion operation different from the first conversion operation and the second conversion operation,
when an output frequency of the PWM-controlled inverter unit becomes higher than a first threshold value from a state of the first mode in which the output frequency of the PWM-controlled inverter unit is equal to or less than the first threshold value, the first mode transitioning to the second mode, and
when the output frequency of the PWM-controlled inverter unit becomes equal to or less than a second threshold value from a state of the second mode in which the output frequency of the PWM-controlled inverter unit is higher than the second threshold value, the second mode transitioning to the first mode, and
the second threshold value being
equal to the first threshold value or
lower than the first threshold value by a predetermined value.

11. The power conversion device according to claim 10, wherein
in the first mode, the direct current voltage command value Vdc* according to the output frequency of the PWM-controlled inverter unit is set.

12. The power conversion device according to claim 10, wherein
in the first mode, the direct current voltage command value Vdc* according to a modulation factor of the PWM-controlled inverter unit is set.

13. The power conversion device according to claim 9, further comprising:
a first mode configured to perform the first conversion operation and the second conversion operation; and
a second mode configured to perform another conversion operation different from the first conversion operation and the second conversion operation,
when a modulation factor of the PWM-controlled inverter unit becomes higher than a first threshold value from a state of the first mode in which the modulation factor of the PWM-controlled inverter unit is equal to or less than the first threshold value, the first mode transitioning to the second mode, and
when the modulation factor of the PWM-controlled inverter unit becomes equal to or less than a second threshold value from a state of the second mode in which the modulation factor of the PWM-controlled inverter unit is higher than the second threshold value, the second mode transitioning to the first mode, and
the second threshold value being
equal to the first threshold value or
lower than the first threshold value by a predetermined value.

14. The power conversion device according to claim 13, wherein
in the first mode, the direct current voltage command value Vdc* according to an output frequency of the PWM-controlled inverter unit is set.

15. The power conversion device according to claim 13, wherein
in the first mode, the direct current voltage command value Vdc* according to the modulation factor of the PWM-controlled inverter unit is set.

16. The power conversion device according to claim 9, wherein
the converter unit includes a bridge circuit including switching elements, the converter unit synchronously rectifies the single-phase alternating current voltage Vin by turning on each of the switching elements in the period of the first conversion operation in synchronization with the single-phase alternating current voltage Vin and turning off each of the switching elements in the period of the second conversion operation, and the converter unit outputs the rectified voltage.

* * * * *